United States Patent
Pu et al.

(10) Patent No.: US 10,158,866 B2
(45) Date of Patent: Dec. 18, 2018

(54) PARSING DEPENDENCY REDUCTION FOR PALETTE INDEX CODING

(71) Applicant: QUALCOMM Incorporated, San Diego, CA (US)

(72) Inventors: Wei Pu, San Diego, CA (US); Joel Sole Rojals, San Diego, CA (US); Marta Karczewicz, San Diego, CA (US); Rajan Laxman Joshi, San Diego, CA (US); Cheng-Teh Hsieh, Del Mar, CA (US); Vadim Seregin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 422 days.

(21) Appl. No.: 14/864,331

(22) Filed: Sep. 24, 2015

(65) Prior Publication Data

US 2016/0094851 A1    Mar. 31, 2016

Related U.S. Application Data

(60) Provisional application No. 62/056,265, filed on Sep. 26, 2014.

(51) Int. Cl.
| | |
|---|---|
| *H04N 7/12* | (2006.01) |
| *H04N 19/186* | (2014.01) |
| *H04N 19/103* | (2014.01) |
| *H04N 19/176* | (2014.01) |
| *H04N 19/182* | (2014.01) |
| *H04N 19/93* | (2014.01) |
| *H04N 19/13* | (2014.01) |
| *H04N 19/593* | (2014.01) |

(Continued)

(52) U.S. Cl.
CPC ......... *H04N 19/186* (2014.11); *H04N 19/103* (2014.11); *H04N 19/13* (2014.11); *H04N 19/157* (2014.11); *H04N 19/176* (2014.11); *H04N 19/182* (2014.11); *H04N 19/593* (2014.11); *H04N 19/91* (2014.11); *H04N 19/93* (2014.11)

(58) Field of Classification Search
None
See application file for complete search history.

(56) References Cited

U.S. PATENT DOCUMENTS

2013/0114893 A1*   5/2013   Alakuijala ........... H04N 19/463
                                                                             382/166

OTHER PUBLICATIONS

S-T Hsiang et al: "Non-SCCE3: Palette index coding using a universal entropy coding scheme", 18. JCT-VC Meeting; Jun. 30, 2014-Jul. 9, 2014; Sapporo; (Joint Collaborative Team on Video Coding of ISO/IEC JTC1/SC29/ WG11 and ITU-T SG.16 ); URL: http://wftp3.itu.int/av-arch/ jctvc-site/, No. JCTVC-R0135-v2, Jun. 29, 2014 (Jun. 29, 2014), XP030116406.*

(Continued)

*Primary Examiner* — James M Anderson, II
(74) *Attorney, Agent, or Firm* — Shumaker & Sieffert, P.A.

(57) ABSTRACT

In an example, a method of processing video data includes determining an input parameter for a truncated binary code that represents a palette index for a pixel of a block of video data based on a number of indices in a palette for the block. The method also includes coding a prefix of the truncated binary code, and determining a palette coding mode for the pixel from a first palette coding mode and a second palette coding mode based only on the prefix of the truncated binary code.

29 Claims, 7 Drawing Sheets

(51) Int. Cl.
    *H04N 19/91*    (2014.01)
    *H04N 19/157*   (2014.01)

(56) References Cited

OTHER PUBLICATIONS

Pu W et al: "SCCE3: Test B.13 ' Flag to Indicate Escape and Index Coding", 18. JCT-VC Meeting; Jun. 30, 2014-Jul. 9, 2014; Sapporo; (Joint Collaborative Team on Video Coding of ISO/IEC JTC1/SC29/ WG11 and ITU-T SG.16 ); URL: http://wftp3.itu.int/av-arch/jctvc-site/, No. JCTVC-R0066, Jun. 21, 2014 (Jun. 21, 2014), XP030116310.*

Pu W et al: "SCCE3: Test B.12 ' Binarization of Escape Sample and Palette Index", 18. JCT-VC Meeting; Jun. 30, 2014-Jul. 9, 2014; Sapporo; (Joint Collaborative Team on Video Coding of ISO/IEC JTC1/SC29/ WG11 and ITU-T SG.16 ); URL: http://wftp3.itu.int/av-arch/ jctvc-site/, No. JCTVC-R0065, Jun. 21, 2014 (Jun. 21, 2014), XP030116309.*

S-T Hsiang et al: "Non-SCCE3:Run coding of the palette index map using a universal entropy coding scheme", 18. JCT-VC Meeting; Jun. 30, 2014-Jul. 9, 2014; Sapporo; (Joint Collaborative Team on Video Coding of ISO/IEC JTC1/SC29/WG11 and ITU-T SG.16 ); URL: http://wftp3.itu.int/av-arch/ jctvc-site/, No. JCTVC-R0136-V3, Jul. 2, 2014 (Jul. 2, 2014), XP030116.*

Wiegand et al., "WD1: Working Draft 1 of High-Efficiency Video Coding," JCTVC-C403, 3rd Meeting: Guangzhou, CN, Oct. 7-15, 2010 (Joint Collaborative Team on Video Coding of ISO/IEC JTC1/SC29/WG11 and ITU-T SG.16); Jan. 6, 2011, 137 pp.

Wiegand et al., "WD2: Working Draft 2 of High-Efficiency Video Coding," JCTVC-D503, 4th Meeting: Daegu, KR, Jan. 20-28, 2011 (Joint Collaborative Team on Video Coding of ISO/IEC JTC1/SC29/WG11 and ITU-T SG.16); Apr. 15, 2011, 153 pp.

Wiegand et al., "WD3: Working Draft 3 of High-Efficiency Video Coding," Document JCTVC-E603, 5th Meeting: Geneva, CH, Mar. 16-23, 2011 (Joint Collaborative Team on Video Coding of ISO/IEC JTC1/SC29/WG11 and ITU-T SG.16); May 9, 2015, 193 pp.

Bross et al., "WD4: Working Draft 4 of High-Efficiency Video Coding," 6th Meeting: Torino, IT, Jul. 14-22, 2011 (Joint Collaborative Team on Video Coding of ISO/IEC JTC1/SC29/WG11 and ITU-T SG.16); JCTVC-F803_d2, Oct. 4, 2011, 226 pp.

Bross et al., "WD5: Working Draft 5 of High-Efficiency Video Coding," 7th Meeting: Geneva, CH, Nov. 21-30, 2011 (Joint Collaborative Team on Video Coding of ISO/IEC JTC1/SC29/WG11 and ITU-T SG.16); JCTVC-G1103_d2, Dec. 30, 2011, 214 pp.

Bross et al., "High efficiency video coding (HEVC) text specification draft 6," 8th Meeting: San Jose, CA, USA, Feb. 1-10, 2012, (Joint Collaborative Team on Video Coding of ISO/IEC JTC1/SC29/WG11 and ITU-T SG.16); JCTVC-H1003, Apr. 2, 2012, 259 pp.

Bross et al., "High efficiency video coding (HEVC) text specification draft 7," 9th Meeting: Geneva, CH, Apr. 27-May 7, 2012 (Joint Collaborative Team on Video Coding of ISO/IEC JTC1/SC29/WG11 and ITU-T SG.16); JCTVC-I1003_d2, Jun. 1, 2012, 290 pp.

Bross et al., "High efficiency video coding (HEVC) text specification draft 8," 10th Meeting: Stockholm, SE, Jul. 11-20, 2012 (Joint Collaborative Team on Video Coding of ISO/IEC JTC1/SC29/WG11 and ITU-T SG.16); JCTVC-J1003_d7, Jul. 28, 2012, 261 pp.

Bross et al., "High Efficiency Video Coding (HEVC) text specification draft 9," 11th Meeting: Shanghai, CN, Oct. 10-19, 2012 (Joint Collaborative Team on Video Coding of ISO/IEC JTC1/SC29/WG11 and ITU-T SG.16); JCTVC-K1003_v7, Nov. 2, 2012, 290 pp.

Bross et al., "High Efficiency Video Coding (HEVC) text specification draft 10 (for FDIS & Last Call)," 12th Meeting: Geneva, CH, Jan. 14-23, 2013 (Joint Collaborative Team on Video Coding of ISO/IEC JTC1/SC29/WG11 and ITU-T SG.16); JCTVC-L1003_v34, Mar. 19, 2013, 310 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

Chen et al., "Description of screen content coding technology proposal by Qualcomm," JCT-VC Meeting, Mar. 27-Apr. 4, 2014; Valencia, ES (Joint Collaborative Team on Video Coding of ISO/IEC JTC1/SC29/WG11 and ITU-T SG.16), No. JCTVC-Q0031-v3, Mar. 28, 2014, XP030115916, 19 pp.

Hsiang et al., "Run Coding of the Palette Index Map using a Universal Entropy Coding Scheme," JCT-VC Meeting; Jun. 30-Jul. 9, 2014; Sapporo; (Joint Collaborative Team on Video Coding of ISO/IEC JTC1/SC29/WG11 and ITU-T SG.16 ); URL: http://wftp3.itu.int/av-arch/jctvc-site/, No. JCTVC-R0136-v3, Jul. 2, 2014; XP030116408, 7 pp.

Hsiang et al., "Non-SCCE3: Palette index coding using a universal entropy coding scheme," JCT-VC Meeting; Jun. 30-Jul. 9, 2014; Sapporo; JP (Joint Collaborative Team on Video Coding of ISO/IEC JTC1/SC29/WG11 and ITU-T SG.16 ); URL: http://wftp3.itu.int/av-arch/jctvc-site/, No. JCTVC-R0135-v2, Jun. 29, 2014, XP030116406, 5 pp.

Pu et al., "SCCE3: Test B.12—Binarization of Escape Sample and Palette Index," JCT-VC Meeting; Jun. 30-Jul. 9, 2014; Sapporo, JP (Joint Collaborative Team on Video Coding (JCT-VC) of ITU-T SG 16 WP 3 and ISO/IEC JTC 1/SC 29/WG 11); URL: http://wftp3.itu.int/av-arch/jctvc-site/, No. JCTVC-R0065, Jun. 21, 2014, 3 pp.

Pu et al.,"SCCE3: Test B.13—Flag to Indicate Escape and Index Coding," JCT-VC Meeting, Jun. 30-Jul. 9, 2014; Sapporo, JP (Joint Collaborative Team on Video Coding of ISO/IEC JTC1/SC29/WG11 and ITU-T SG.16 ); URL: http://wftp3.itu.int/av-arch/jctvc-site/, No. JCTVC-R0066, Jun. 21, 2014, XP030116310., 3 pp.

Pu et al., "Non-CE6: Palette parsing dependency and palette encoder improvement," JCT-VC Meeting; Oct. 17-24, 2014; Strasbourg, FR (Joint Collaborative Team on Video Coding of ISO/IEC JTC1/SC29/WG11 and ITU-T SG.16 ); No. JCTVC-50156, Oct. 8, 2014; 3 pp.

"Truncated binary encoding," Wikipedia.org, accessed on Aug. 27, 2014 from from https://en.wikipedia.org/wiki/Truncated_binary_encoding, 4 pp.

Joshi et al., "Non-SCCE3: Contexts for coding index runs," JCT-VC Meeting; Jun. 30-Jul. 9, 2014; Sapparo, JP (Joint Collaborative Team on Video Coding of ISO/IEC JTC1/SC29/WG11 and ITU-T SG.16 ); No. JCTVC-R0174_r2, Jul. 2, 2014; 3 pp.

Pu et al., "AHG10: Suggested Software for Palette Coding based on RExt6.0," JCT-VC Meeting; Mar. 27-Apr. 4, 2014, Valencia, ES (Joint Collaborative Team on Video Coding of ISO/IEC JTC1/SC29/WG11 and ITU-T SG.16 ); No. JCTVC-Q0094, Mar. 19, 2014; 4 pp.

Seregin et al., "Non-SCCE3: Run-length coding for palette predictor," JCT-VC Meeting; Jun. 30-Jul. 9, 2014; Sapparo, JP (Joint Collaborative Team on Video Coding of ISO/IEC JTC1/SC29/WG11 and ITU-T SG.16 ); No. JCTVC-R0228r1, Jul. 2, 2014, 4 pp.

Joshi et al., "High Efficiency Video Coding (HEVC) Screen Content Coding: Draft 1," JCT-VC Meeting; Jun. 30-Jul. 9, 2014; Sapparo, JP (Joint Collaborative Team on Video Coding of ISO/IEC JTC1/SC29/WG11 and ITU-T SG.16 ); No. JCTVC-R1005_v3, Sep. 27, 2014; 362 pp.

International Search Report and Written Opinion from International Application No. PCT/US2015/052195, dated Dec. 18, 2015, 13 pp.

Response to Written Opinion dated Dec. 18, 2015, from International Application No. PCT/US2015/052195, filed on Jun. 16, 2016, 4 pp.

Second Written Opinion from International Application No. PCT/US2015/052195, dated Jul. 26, 2016, 9 pp.

(56) References Cited

OTHER PUBLICATIONS

Response to Second Written Opinion dated Jul. 26, 2016, from International Application No. PCT/US2015/052195, filed on Sep. 21, 2016, 4 pp.
International Preliminary Report on Patentability from International Application No. PCT/US2015/052195, dated Oct. 21, 2016, 10 pp.

* cited by examiner

PARSING DEPENDENCY REDUCTION FOR PALETTE INDEX CODING

This application claims the benefit of U.S. Provisional Application No. 62/056,265, filed Sep. 26, 2014, the entire contents of which are incorporated by reference herein.

TECHNICAL FIELD

This disclosure relates to video encoding and decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaining devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicates the difference between the coded block and the predictive block. An intra-coded block is encoded according to an intra-coding mode and the residual data. For further compression, the residual data may be transformed from the pixel domain to a transform domain, resulting in residual coefficients, which then may be quantized.

SUMMARY

Techniques of this disclosure relate to palette-based video coding. In palette-based coding, a video coder (a video encoder or video decoder) may form a "palette" as a table of colors for representing the video data of the particular area (e.g., a given block). Palette-based coding may be especially useful for coding areas of video data having a relatively small number of colors. Rather than coding actual pixel values (or their residuals), the video coder may code palette indices for one or more of the pixels that relate the pixels with entries in the palette representing the colors of the pixels. The techniques described in this disclosure may include techniques for determining a palette mode from a plurality of palette modes. In particular, the techniques may result in increased efficiency when selecting between a first palette coding mode and a second coding mode by eliminating a parsing dependency associated with syntax of the first palette coding mode and the second palette coding mode.

In an example, a method of processing video data includes determining an input parameter for a truncated binary code that represents a palette index for a pixel of a block of video data based on a number of indices in a palette for the block. The method also includes coding a prefix of the truncated binary code, and determining a palette coding mode for the pixel from a first palette coding mode and a second palette coding mode based only on the prefix of the truncated binary code.

In another example, a device for processing video data includes a memory configured to store a block of video data, and a video coder configured to determine an input parameter for a truncated binary code that represents a palette index for a pixel of the block of video data based on a number of indices in a palette for the block, code a prefix of the truncated binary code, and determine a palette coding mode for the pixel from a first palette coding mode and a second palette coding mode based only on the prefix of the truncated binary code.

In another example, an apparatus for processing video data includes means for determining an input parameter for a truncated binary code that represents a palette index for a pixel of a block of video data based on a number of indices in a palette for the block, means for coding a prefix of the truncated binary code, and means for determining a palette coding mode for the pixel from a first palette coding mode and a second palette coding mode based only on the prefix of the truncated binary code.

In another example, a non-transitory computer-readable storage medium has instructions stored thereon that, when executed, cause one or more processors to determine an input parameter for a truncated binary code that represents a palette index for a pixel of a block of video data based on a number of indices in a palette for the block, code a prefix of the truncated binary code, and determine a palette coding mode for the pixel from a first palette coding mode and a second palette coding mode based only on the prefix of the truncated binary code.

The details of one or more examples of the disclosure are set forth in the accompanying drawings and the description below. Other features, objects, and advantages will be apparent from the description, drawings, and claims.

DETAILED DESCRIPTION

Figure 1:
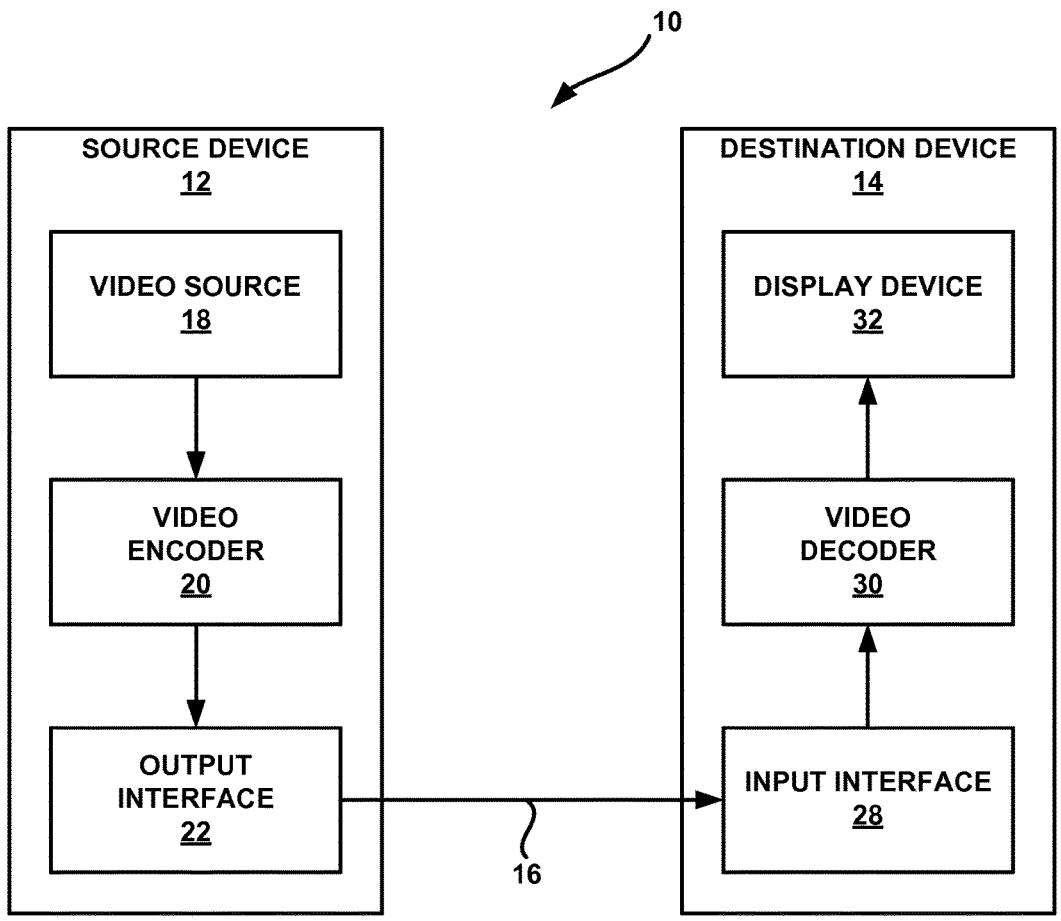
FIG. 1 is a block diagram illustrating an example video coding system that may utilize the techniques described in this disclosure.

This disclosure describes techniques for video coding and compression. In particular, this disclosure describes techniques for palette-based coding of video data. In traditional video coding, images are assumed to be natural images that are continuous-tone and spatially smooth. Based on these assumptions, various tools have been developed such as block-based transform, filtering, etc., and such tools have shown good performance for natural content videos.

However, in applications like remote desktop, collaborative work and wireless display, computer generated screen content may be the dominant content to be compressed. This type of content tends to have discrete-tone and feature sharp lines and high contrast object boundaries. The assumption of continuous-tone and smoothness may no longer apply, and thus, traditional video coding techniques may be inefficient ways to compress the content.

In some examples, the palette-based coding techniques may be configured for use with one or more video coding standards. For example, High Efficiency Video Coding (HEVC) is a new video coding standard being developed by the Joint Collaboration Team on Video Coding (JCT-VC) of ITU-T Video Coding Experts Group (VCEG) and ISO/IEC Motion Picture Experts Group (MPEG). A recent HEVC text specification draft is described in Bross et al., "High Efficiency Video Coding (HEVC) Text Specification Draft 10 (for FDIS & Consent)," JCVC-L1003_v13, $12^{th}$ Meeting of JCT-VC of ITU-T SG16 WP 3 and ISO/IEC JCT 1/SC 29/WG 11, 14-23 Jan. 2013 ("HEVC Draft 10").

With respect to the HEVC framework, as an example, the palette-based coding techniques may be configured to be used as a coding unit (CU) mode. In other examples, the palette-based coding techniques may be configured to be used as a PU mode in the framework of HEVC. Accordingly, all of the following disclosed processes described in the context of a CU mode may, additionally or alternatively, apply to PU. However, these HEVC-based examples should not be considered a restriction or limitation of the palette-based coding techniques described herein, as such techniques may be applied to work independently or as part of other existing or yet to be developed codecs/systems/standards. In these cases, the unit for palette coding can be square blocks, rectangular blocks or even regions of non-rectangular shape.

In palette-based coding, a particular area of video data may be assumed to have a relatively small number of colors. A video coder (a video encoder or video decoder) may code a so-called "palette" as a table of colors for representing the video data of the particular area (e.g., a given block). Each pixel may be associated with an entry in the palette that represents the color of the pixel. For example, the video coder may code an index that relates the pixel value to the appropriate value in the palette.

In the example above, a video encoder may encode a block of video data by determining a palette for the block, locating an entry in the palette to represent the value of each pixel, and encoding the palette with palette indices (also referred to as palette index values) for the pixels relating the pixel value to the palette. A video decoder may obtain, from an encoded bitstream, a palette for a block, as well as palette indices for the pixels of the block. The video decoder may relate the palette indices of the pixels to entries of the palette to reconstruct the pixel values of the block. Pixels (and/or related palette indices that indicate a pixel value) may generally be referred to as samples.

It is assumed that samples in the block are processed (e.g., scanned) using horizontal raster scanning order. For example, the video encoder may convert a two-dimensional block of palette indices into a one-dimensional array by scanning the palette indices using a horizontal raster scanning order. Likewise, the video decoder may reconstruct a block of palette indices using the horizontal raster scanning order. Accordingly, this disclosure may refer to a previous sample as a sample that precedes the sample currently being coded in the block in the scanning order. It should be appreciated that scans other than a horizontal raster scan, such as vertical raster scanning order, may also be applicable. The example above is intended to provide a general description of palette-based coding.

A palette typically includes entries numbered by an index and representing color component (for example, RGB, YUV, or the like) values or intensities. Both a video encoder and a video decoder determine the number of palette entries, color component values for each palette entry and the exact ordering of the palette entries for the current block. In this disclosure, it is assumed that each palette entry specifies the values for all color components of a sample. However, the concepts of this disclosure are applicable to using a separate palette for each color component.

In some examples, a palette may be composed using information from previously coded blocks. That is, a palette may contain predicted palette entries predicted from the palette(s) used to code the previous block(s). For example, as described in standard submission document Wei Pu et al., "AHG10: Suggested Software for Palette Coding based on RExt6.0," JCTVC-Q0094, Valencia, E S, 27 Mar. 4 Apr. 2014 (hereinafter JCTVC-Q0094), a palette may include entries that are copied from a predictor palette. A predictor palette may include palette entries from blocks previously coded using palette mode or other reconstructed samples. For each entry in the predictor palette, a binary flag may be coded to indicate whether the entry associated with the flag is copied to the current palette (e.g., indicated by flag=1). The string of binary flags may be referred to as the binary palette prediction vector. The palette for coding a current block may also include a number of new palette entries, which may be explicitly coded (e.g., separately from the palette prediction vector). An indication of the number of new entries may also be coded. A sum of the predicted entries and new entries may indicate the total palette size for block.

In some examples, each sample in a block coded with a palette-based coding mode may be coded using one of the three palette modes or a subset of them (e.g. only Copy Top mode and Copy Left mode or another combination of modes), as set forth below:

Escape mode: in this mode, the sample value is not included into a palette as a palette entry and the quantized sample value is signaled explicitly for all color components. It is similar to the signaling of the new palette entries, although for new palette entries, the color component values are not quantized.

Copy Top mode (also referred to as Copy Above mode): in this mode, the palette entry index for the current sample is copied from the sample located directly above in a block. Only a syntax element specifying the length of the copy (run length) is signaled in the bitstream.

Copy Left mode (also referred to as Index mode or Value mode): In this mode, the value of the palette entry index is explicitly signaled using truncated binary code followed by another syntax element specifying how many following pixels in scanning order shares the same index as the signaled one (run length).

As described herein, a palette entry index may be referred as a palette index or simply index. These terms can be used interchangeably to describe techniques of this disclosure. In addition, as described in greater detail below, a palette index may have one or more associated color or intensity values. For example, a palette index may have a single associated color or intensity value associated with a single color or intensity component of a pixel (e.g., an Red component of RGB data, a Y component of YUV data, or the like). In another example, a palette index may have multiple associated color or intensity values. In some instances, palette-based coding may be applied to code monochrome video. Accordingly, "color value" may generally refer to any color or non-color component used to generate a pixel value.

For Copy Top and Copy Left modes, a run value (which may also be referred to simply as run) may also be signaled. A run value may indicate a number of consecutive samples (e.g., a run of samples) in a particular scan order in a palette-coded block that are coded together. In some instances, the run of samples may also be referred to as a run of palette indices, because each sample of the run has an associated index to a palette.

A run value may indicate a run of palette indices that are coded using the same palette-coding mode. For example, with respect to Copy Left mode, a video coder (a video encoder or video decoder) may code a palette index (also referred to as a palette index value or simply index value) and a run value that indicates a number of consecutive samples in a scan order that have the same palette index and that are being coded with the palette index. With respect to Copy Top mode, the video coder may code an indication that an index for the current sample value is copied based on an index of an above-neighboring sample (e.g., a sample that is positioned above the sample currently being coded in a block) and a run value that indicates a number of consecutive samples in a scan order that also copy a palette index from an above-neighboring sample and that are being coded with the palette index. Accordingly, in the examples above, a run of palette indices refers to a run of palette indices having the same value or a run of palette indices that are copied from above-neighboring palette indices.

Hence, the run may specify, for a given mode, the number of subsequent samples that belong to the same mode. In some instances, signaling an index and a run value may be similar to run length coding. In an example for purposes of illustration, a string of consecutive palette indices of a block may be 0, 2, 2, 2, 2, 5 (e.g., where each index corresponds to a sample in the block). In this example, a video coder may code the second sample (e.g., the first palette index having a value of two) using Copy Left mode. After coding an index that is equal to 2, the video coder may code a run of three, which indicates that the three subsequent samples also have the same palette index of two. In a similar manner, coding a run of four palette indices after coding an index using Copy Top mode may indicate that a total of five palette indices are copied from the corresponding palette indices in the row above the sample position currently being coded.

Escape samples (also referred to as escape pixels) may be samples (or pixels) of a block that do not have a corresponding color represented in a palette for coding the block. Accordingly, escape samples may not be reconstructed using a color entry (or pixel value) from a palette. Instead, the color values for escape samples are signaled in a bitstream separately from the color values of the palette.

A video coder (e.g., a video encoder and a video decoder) may code per-sample data that indicates whether a sample of a palette-coded block is coded based on a color of the sample not being included in a palette for the block, e.g., using the process referred to as "Escape mode" above. In some examples, the video coder may be configured to increase the number of palette entries of a palette by one to accommodate a special index to the palette that does not correspond to any palette entry. The video coder may include the additional index as the last palette index in the increased palette for a given block. The additional index may be used as an indication of Escape mode.

In the example described above, the video coder may code, for a particular sample value of a block, data that represents the additional index to indicate that the additional sample is coded as an escape sample (e.g., a sample that does not have a color value represented in a palette for coding the block). The video coder may also code the color value(s) of the escape sample. In this example, there are only two possible modes (e.g., Copy Top mode or Copy Left mode (also referred to as Index mode or Value mode)) to be signaled using explicit syntax. For example, if a sample is coded in Copy Left mode and the index for Copy Left mode is equal to the escape index (e.g., the above-noted additional index to the palette), the video coder may infer the sample to be coded as an escape sample. In some instances, no run is signaled with escape samples.

For a palette-coded block, one or more syntax elements may indicate, at block-level (e.g., a CU level or LCU level), whether any sample of the block is coded based on a color value of the sample not being included in the palette, e.g., coded as an escape sample. The one or more syntax elements may be referred to as block-level escape syntax. For example, block-level syntax may refer to syntax that is coded or determined while coding a block of video data, such as a CU or LCU. Block-level syntax may be included in a header or with other data that is associated with the block (e.g., data that is coded prior to or subsequent to a block that describes a characteristic of the block). In contrast, other syntax that is not block-level syntax may be included in a slice header or with individual pixels of video data.

In one example, a video coder may be configured to code and/or determine a flag (which may be referred to as a block-level escape flag) that indicates whether any sample of the block is coded based on a color value not being included in the palette. For example, a flag value of zero may indicate that none of the samples of the block are coded using Escape mode. That is, the value of all samples of a block may be determined based on a color value that is included in a palette for coding the block. A flag value of one may indicate that at least one sample of the block is coded using Escape mode. That is, the value of at least one sample is not included in a palette for coding the block and may be separately signaled. Hence, the flag may indicate, for all samples of a block of video data, whether at least one sample of the block has a color value that is not included in a palette for coding the block.

Hence, in some examples, a CU level escape flag may be signaled in the bitstream that specifies whether the current CU may have an escape pixel or not. For example, the CU level escape flag may indicate whether escape values are enabled for a particular CU. As noted above, the presence of an escape sample in a CU may impact the number of palette indices for the CU. For example, a palette for a CU may have a number of indices with a largest index N, e.g., such that the index may be chosen from $\{0, 1, \ldots, N\}$, inclusively.

In some instances, however, if the CU level escape flag indicates that there may be an escape pixel in the current block, the possible index values in the current block may be $\{0, 1, \ldots, N, N+1\}$, where an index equal to N+1 indicates that the current pixel is an escape pixel. In such instances, for a particular sample being coded, the syntax elements that follow the index N+1 may be the quantized pixel values. As noted above, an index less than N+1 may indicate that the current pixel is in Copy Left mode and the following syntax element may indicate run length for the Copy Left mode.

In the example above, a video coder (a video encoder or video decoder) may determine a palette coding mode from a plurality of palette coding modes for coding a particular pixel based on a palette index for the pixel (e.g., an index of N+1 indices indicates Escape mode and an index of less than N+1 indicates a Copy Left mode). In some instances, the video coder may code the palette index for the pixel using a truncated binary code having an input parameter that is based on the size of the palette. However, certain coding processes may impact the input parameter to the truncated binary code. For example, a redundancy removal process described in the standard submission document JCTVC-R0065 ("SCCE3: Test B.12—Binarization of Escape Sample and Palette index," Wei Pu et al., JCTVC-R0065, Sapporo, J P, 30 Jun.-9 Jul. 2014), includes adjusting the input parameter based on the palette coding modes of neighboring pixels.

As described in greater detail below, changing the input parameter to the truncated binary code (and the resulting prefix and suffix values) from pixel to pixel may introduce parsing dependencies when coding indices, which may impact the ability to code syntax in parallel. For example, a video coder must first determine whether the input parameter has been adjusted based on palette coding modes of neighboring pixels, prior to determining the index value for the current pixel.

Aspects of this disclosure may be used to reduce inter syntax dependency and increase parallelism for coding palette index values. For example, according to aspects of this disclosure, a video coder (a video encoder or video decoder) may determine an input parameter for a truncated binary code that represents a palette index for a pixel based on a number of indices in the palette. The video coder may also determine a palette coding mode for the pixel from a first palette coding mode and a second palette coding mode based only on the prefix of the truncated binary code. That is, the video coder may not adjust the input parameter prior to coding the truncated binary code and determining the palette coding mode.

In some examples, according to aspects of this disclosure, a particular truncated binary codeword may be reserved for one palette coding mode of a plurality. For example, according to aspects of this disclosure, an all zero codeword may be reserved for indicating that a pixel is an escape coded sample. In this example, a video coder may be configured to determine that a pixel is coded as an escape sample upon decoding a prefix of a truncated binary code, where the prefix has all bins equal to zero.

Additionally or alternatively, according to aspects of this disclosure, a prefix of a truncated binary code that represents a palette index may be separated from the suffix of the truncated binary code in a bitstream by one or more other syntax values. For example, a video coder may be configured to code a prefix of a truncated binary code to determine a palette coding mode for a pixel. In instances in which the prefix corresponds to a palette index other than a palette index reserved for indicating an escape sample, the video coder may code data that indicates a run length of a run of pixels being coded with the current pixel. The video coder may also code a suffix of the truncated binary code to determine the index value for the current pixel, where the suffix follows the data that indicates the run length in the bitstream.

The techniques above may be used to reduce coding and/or hardware complexity, because a video coder may distinguish between palette coding modes for a current pixel based only on the prefix of a truncated binary code that indicates an index value for the current pixel (e.g., without adjusting the index). Moreover, the video coder may be able to perform certain coding processes in parallel, such as the coding of an index value and the coding of run length syntax associated with the index value. Hence, in some examples, aspects of this disclosure may reduce coding and/or codec hardware complexity when coding data associated with Copy Left and Escape modes in instances in which block-level escape syntax indicates that escape pixels may exist in the block currently being coded.

FIG. 1 is a block diagram illustrating an example video coding system 10 that may utilize the techniques of this disclosure. As used herein, the term "video coder" refers generically to both video encoders and video decoders. In this disclosure, the terms "video coding" or "coding" may refer generically to video encoding or video decoding. Video encoder 20 and video decoder 30 of video coding system 10 represent examples of devices that may be configured to perform techniques for palette-based video coding in accordance with various examples described in this disclosure. For example, video encoder 20 and video decoder 30 may be configured to selectively code various blocks of video data, such as CUs or PUs in HEVC coding, using either palette-based coding or non-palette based coding. Non-palette based coding modes may refer to various inter-predictive temporal coding modes or intra-predictive spatial coding modes, such as the various coding modes specified by HEVC Draft 10.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). The one or more communication media may include routers, switches, base stations, or other equipment that facilitate communication from source device 12 to destination device 14.

In another example, channel 16 may include a storage medium that stores encoded video data generated by source device 12. In this example, destination device 14 may access the storage medium, e.g., via disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an Internet connection. Example types of data connections may include wireless channels (e.g., Wi-Fi connections), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

Video coding system 10 illustrated in FIG. 1 is merely an example and the techniques of this disclosure may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In many examples, the encoding and decoding is performed by devices that do not communicate with one another, but simply encode data to memory and/or retrieve and decode data from memory.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device, e.g., a video camera, a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. In other examples, the encoded video data may also be stored onto a storage medium or a file server for later access by destination device 14 for decoding and/or playback.

In the example of FIG. 1, destination device 14 includes an input interface 28, a video decoder 30, and a display device 32. In some examples, input interface 28 includes a receiver and/or a modem. Input interface 28 may receive encoded video data over channel 16. Display device 32 may be integrated with or may be external to destination device 14. In general, display device 32 displays decoded video data. Display device 32 may comprise a variety of display devices, such as a liquid crystal display (LCD), a plasma display, an organic light emitting diode (OLED) display, or another type of display device.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" or "transmitting" certain information to another device, such as video decoder 30. The term "signaling" or "transmitting" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium.

In some examples, video encoder 20 and video decoder 30 operate according to a video compression standard, such as HEVC standard mentioned above, and described in HEVC Draft 10. In addition to the base HEVC standard, there are ongoing efforts to produce scalable video coding, multiview video coding, and 3D coding extensions for HEVC. In addition, palette-based coding modes, e.g., as described in this disclosure, may be provided for extension of the HEVC standard. In some examples, the techniques described in this disclosure for palette-based coding may be applied to encoders and decoders configured to operation according to other video coding standards, such as the ITU-T-H.264/AVC standard or future standards. Accordingly, application of a palette-based coding mode for coding of coding units (CUs) or prediction units (PUs) in an HEVC codec is described for purposes of example.

In HEVC and other video coding standards, a video sequence typically includes a series of pictures. Pictures may also be referred to as "frames." A picture may include three sample arrays, denoted $S_L$, $S_{Cb}$ and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may be a coding tree block of luma samples, two corresponding coding tree blocks of chroma samples, and syntax structures used to code the samples of the coding tree blocks. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in the raster scan.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may be a coding block of luma samples and two corresponding coding blocks of chroma samples of a picture that has a luma sample array, a Cb sample array and a Cr sample array, and syntax structures used to code the samples of the coding blocks. Video encoder 20 may partition a coding block of a CU into one or more prediction blocks. A prediction block may be a rectangular (i.e., square or non-square) block of samples on which the same prediction is applied. A prediction unit (PU) of a CU may be a prediction block of luma samples, two corresponding prediction blocks of chroma samples of a picture, and syntax structures used to predict the prediction block samples. Video encoder 20 may generate predictive luma, Cb and Cr blocks for luma, Cb and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU.

If video encoder 20 uses inter prediction to generate the predictive blocks of a PU, video encoder 20 may generate the predictive blocks of the PU based on decoded samples of one or more pictures other than the picture associated with the PU. Video encoder 20 may use uni-prediction or bi-prediction to generate the predictive blocks of a PU. When video encoder 20 uses uni-prediction to generate the predictive blocks for a PU, the PU may have a single motion vector (MV). When video encoder 20 uses bi-prediction to generate the predictive blocks for a PU, the PU may have two MVs.

After video encoder 20 generates predictive luma, Cb and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb and Cr residual blocks of a CU into one or more luma, Cb and Cr transform blocks. A transform block may be a rectangular block of samples on which the same transform is applied. A transform unit (TU) of a CU may be a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a lama coefficient block, a Cb coefficient block or a Cr coefficient block), video encoder 20 may quantize the coefficient block. Quantization generally refers to a process in which transform coefficients are quantized with the intention of reducing the amount of data used to represent the transform coefficients, providing further compression. After video encoder 20 quantizes a coefficient block, video encoder 20 may entropy encoding syntax elements indicating the quantized transform coefficients. For example, video encoder 20 may perform Context-Adaptive Binary Arithmetic Coding (CABAC) on the syntax elements indicating the quantized transform coefficients. Video encoder 20 may output the entropy-encoded syntax elements in a bitstream.

Video encoder 20 may output a bitstream that includes the entropy-encoded syntax elements. The bitstream may include a sequence of bits that forms a representation of coded pictures and associated data. The bitstream may comprise a sequence of network abstraction layer (NAL) units. Each of the NAL units includes a NAL unit header and encapsulates a raw byte sequence payload (RBSP). The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a picture parameter set (PPS), a second type of NAL unit may encapsulate an RBSP for a coded slice, a third type of NAL unit may encapsulate an RBSP for SEI, and so on. NAL units that encapsulate RBSPs for video coding data (as opposed to RBSPs for parameter sets and SEI messages) may be referred to as video coding layer (VCL) NAL units.

Video decoder 30 may receive a bitstream generated by video encoder 20. In addition, video decoder 30 may parse the bitstream to decode syntax elements from the bitstream. Video decoder 30 may reconstruct the pictures of the video data based at least in part on the syntax elements decoded from the bitstream. The process to reconstruct the video data may be generally reciprocal to the process performed by video encoder 20. For instance, video decoder 30 may use MVs of PUs to determine predictive blocks for the PUs of a current CU. In addition, video decoder 30 may inverse quantize transform coefficient blocks associated with TUs of the current CU. Video decoder 30 may perform inverse transforms on the transform coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

In some examples, video encoder 20 and video decoder 30 may be configured to perform palette-based coding. For example, in palette-based coding, rather than performing the intra-predictive or inter-predictive coding techniques described above, video encoder 20 and video decoder 30 may code a so-called palette as a table of colors for representing the video data of the particular area (e.g., a given block). Each pixel may be associated with an entry in the palette that represents the color of the pixel. For example, video encoder 20 and video decoder 30 may code an index that relates the pixel value to the appropriate value in the palette.

In the example above, video encoder 20 may encode a block of video data by determining a palette for the block, locating an entry in the palette to represent the value of each pixel, and encoding the palette with palette indices for the pixels relating the pixel value to the palette. Video decoder 30 may obtain, from an encoded bitstream, a palette for a block, as well as palette indices for the pixels of the block. Video decoder 30 may relate the palette indices of the pixels to entries of the palette to reconstruct the pixel values of the block.

As noted above, video encoder 20 and video decoder 30 may use a number of different palette coding modes to code palette indices of a palette. For example, video encoder 20 and video decoder 30 may use an Escape mode, a Copy Top mode (also referred to as Copy Above mode), or a Copy Left mode (also referred to as Index mode or Value mode) to code palette indices of a block. In general, coding a sample using "Escape mode" may generally refer coding a sample of a block that does not have a corresponding color represented in a palette for coding the block. As noted above, such samples may be referred to as escape samples or escape pixels.

With respect to escape signaling, video encoder 20 may encode, for a particular sample value of a block, data that represents an additional palette index to indicate that the additional sample is coded as an escape sample (e.g., a sample that does not have a color value represented in a palette for coding the block). Video encoder 20 may also encode the color value(s) of the escape sample. Accordingly, in this example, video encoder 20 and video decoder 30 may code syntax to distinguish between Copy Top mode and Copy Left mode. In addition, video encoder 20 and video decoder 30 may then distinguish between an escape coded pixel and Copy Left mode (or Copy Top mode) based on the index value of the pixel being coded (e.g., based on whether the index value is included in an N number of entries in the palette or whether the index value is the additional index N+1).

In some examples, video encoder 20 and video decoder 30 may code data that indicates an index value of a palette based on a size of the palette, e.g., the number of indices for the palette. For example, video encoder 20 and video decoder 30 may determine an input parameter to a truncated binary code that indicates an index value based on a size of the palette for a CU that contains the pixel currently being coded. In this example, the resulting truncated binary code may include a prefix part and a suffix part.

For example, truncated binary coding may be described in greater detail at http://en.wikipedia.org/wiki/Truncated_binary_encoding and the standard submission document JCTVC-R1005 ("High Efficiency Video Coding (HEVC) Screen Content Coding Draft Text 1," JCTVC-R1005, Sapporo, J P, 30 Jun. -9 Jul. 2014). In general, truncated binary coding may be used for uniform probability distributions with a finite alphabet. Truncated binary coding may be parameterized by an alphabet with total size of number n. For example, if n is a power of two then the coded value for $0 \le x < n$ is the simple binary code for x of length $\log_2(n)$. Otherwise, let $k = \text{floor}(\log_2(n))$ such that $2^k \le n < 2^{k+1}$ and let $u = 2^{k+1} - n$.

Truncated binary coding assigns the first u symbols codewords (also referred to as codes) of length k and then assigns to the remaining n−u symbols the last n−u codewords of length k+1. Because all the codewords of length k+1 consist of an unassigned codeword of length k with a "0" or "1" appended, the resulting code is a prefix code. In an example for purposes of illustration, for the alphabet {0, 1, 2, 3, 4}, n=5 and $2^2 \le n < 2^3$, hence k=2 and $u = 2^3 - 5$, which results in u=3. Truncated binary encoding assigns the first u symbols the codewords 00, 01, and 10, all of length 2, then assigns the last n−u symbols the codewords 110 and 111, the last two codewords of length 3. As shown in the example table below, if n is 5, plain binary encoding and truncated binary encoding allocates the following codewords (digits shown in double brackets [[ ]] are not transmitted in truncated binary).

| Truncated Binary | Encoding | Standard Binary |
| --- | --- | --- |
| 0 | [[0]] 0 0 | 0 |
| 1 | [[0]] 0 1 | 1 |
| 2 | [[0]] 1 0 | 2 |
| Unused | [[0]] [[1]] [[1]] | 3 |
| Unused | [[1]] [[0]] [[0]] | 4 |
| Unused | [[1]] [[0]] [[1]] | 5/Unused |
| 3 | 1 1 0 | 6/Unused |
| 4 | 1 1 1 | 7/Unused |

In the example above, it takes 3 bits to encode n using standard binary encoding, hence $2^3 - n = 8$, and 8−5=3 bits are unused. In numerical terms, to send a value x where 0≤x<n, and where there are $2^k \le n < 2^{k+1}$ symbols, there are $u=2^{k+1}-n$ unused entries when the alphabet size is rounded up to the nearest power of two. The process to encode the number x in truncated binary is: if x is less than u, encode x in k binary bits; if x is greater than or equal to u, encode the value x+u in k+1 binary bits. Accordingly, the suffix part may (or may not) be included for a particular truncated binary code, depending on the input parameter to the truncated binary code.

According to aspects of this disclosure, video encoder 20 and video decoder 30 may determine an input parameter for a truncated binary code that represents a palette index for a pixel based on a number of indices in the palette. Video encoder 20 and video decoder 30 may distinguish between a first palette coding mode and a second palette coding mode based only on the prefix of the truncated binary code. For example, video encoder 20 and video decoder 30 may not adjust the input parameter prior to coding the truncated binary code and determining the palette coding mode.

In an example for purposes of illustration, to code a current pixel of a block of video data, video encoder 20 may encode and video decoder 30 may decode a syntax element that distinguishes between the Copy Above mode and the Copy Left mode, such as a palette_mode syntax element. In addition, if the syntax element indicates that the palette mode for the current pixel is Copy Left mode (or, alternatively, Copy Above mode), video encoder 20 and video decoder 30 may determine an input parameter to a truncated binary code that represents a palette index for the current pixel based on a maximum number of indices in the palette. According to aspects of this disclosure, video encoder 20 and video decoder 30 may determine the input parameter to the truncated binary code without adjusting the maximum number of indices in the palette.

In addition, in the example above, video encoder 20 and video decoder 30 may distinguish between Copy left mode (or, alternatively, Copy Above mode) and Escape mode based only on a prefix of the truncated binary code. For example, according to aspects of this disclosure, a particular truncated binary code may be reserved for indicating that a pixel is coded as an escape pixel, such as a prefix code that has all bins that are equal to zero. In this example, video encoder 20 and video decoder 30 may be able to distinguish whether the current pixel is coded in CopyLeft mode or Escape mode based on whether the prefix has all bins equal to zero.

Continuing with the example above, if the current pixel is not coded as an escape sample, video encoder 20 and video decoder 30 may be configured to code data that indicates a run length of pixels being coded with the current pixel, as well as a suffix of the truncated binary code, if such a suffix exists based on the input parameter. In some examples, the suffix of the truncated binary code may follow data that indicates the run length in the bitstream.

Figure 2:
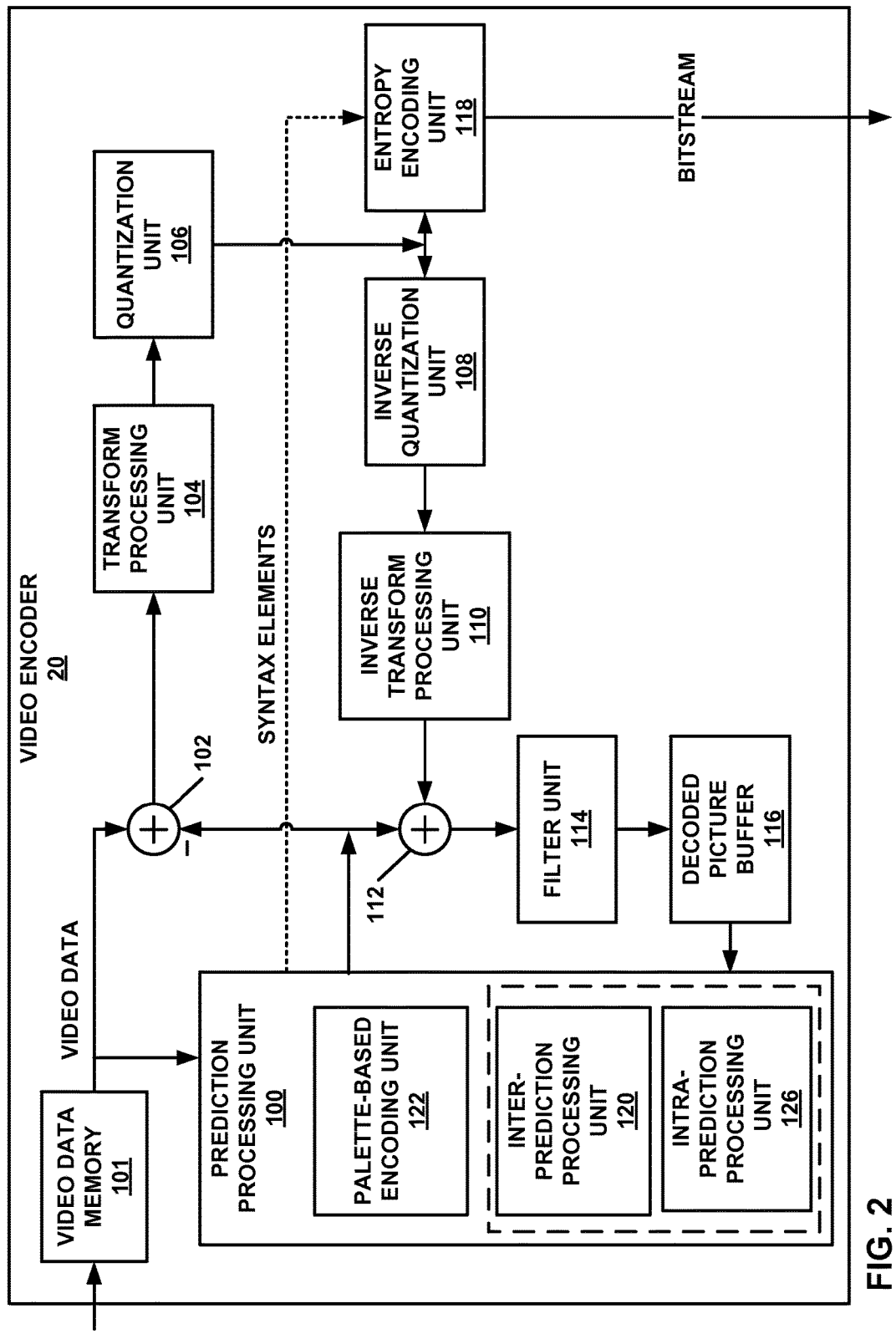
FIG. 2 is a block diagram illustrating an example video encoder that may implement the techniques described in this disclosure.

FIG. 2 is a block diagram illustrating an example video encoder 20 that may implement the techniques of this disclosure. FIG. 2 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

Video encoder 20 represents an example of a device that may be configured to perform techniques for palette-based video coding in accordance with various examples described in this disclosure. For example, video encoder 20 may be configured to selectively code various blocks of video data, such as CUs or PUs in HEVC coding, using either palette-based coding or non-palette based coding. Non-palette based coding modes may refer to various inter-predictive temporal coding modes or intra-predictive spatial coding modes, such as the various coding modes specified by HEVC Draft 10. Video encoder 20, in one example, may be configured to generate a palette having entries indicating pixel values, select pixel values in a palette to represent pixels values of at least some pixel locations in a block of video data, and signal information associating at least some of the pixel locations in the block of video data with entries in the palette corresponding, respectively, to the selected pixel values in the palette. The signaled information may be used by video decoder 30 to decode video data.

In the example of FIG. 2, video encoder 20 includes a prediction processing unit 100, video data memory 101, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 includes a motion estimation unit and a motion compensation unit (not shown). Video encoder 20 also includes a palette-based encoding unit 122 configured to perform various aspects of the palette-based coding techniques described in this disclosure. In other examples, video encoder 20 may include more, fewer, or different functional components.

Video data memory 101 may store video data to be encoded by the components of video encoder 20. The video data stored in video data memory 101 may be obtained, for example, from video source 18. Decoded picture buffer 116 may be a reference picture memory that stores reference video data for use in encoding video data by video encoder 20, e.g., in intra- or inter-coding modes. Video data memory 101 and decoded picture buffer 116 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 101 and decoded picture buffer 116 may be provided by the same memory device or separate memory devices. In various examples, video data memory 101 may be on-chip with other components of video encoder 20, or off-chip relative to those components.

Video encoder 20 may receive video data. Video encoder 20 may encode each CTU in a slice of a picture of the video data. Each of the CTUs may be associated with equally-sized lama coding tree blocks (CTBs) and corresponding CTBs of the picture. As part of encoding a CTU, prediction processing unit 100 may perform quad-tree partitioning to divide the CTBs of the CTU into progressively-smaller blocks. The smaller block may be coding blocks of CUs. For example, prediction processing unit 100 may partition a CTB associated with a CTU into four equally-sized sub-blocks, partition one or more of the sub-blocks into four equally-sized sub-blocks, and so on.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU by performing inter-prediction on each PU of a CU. The predictive data for the PU may include predictive blocks of the PU and motion information for the PU. Inter-prediction processing unit 120 may perform different operations for a PU of a CU depending on whether the PU is in an I slice, a P slice, or a B slice. In an I slice, all PUs are intra predicted. Hence, if the PU is in an I slice, inter-prediction processing unit 120 does not perform inter prediction on the PU. Thus, for blocks encoded in I-mode, the predicted block is formed using spatial prediction from previously-encoded neighboring blocks within the same frame.

If a PU is in a P slice, the motion estimation unit of inter-prediction processing unit 120 may search the reference pictures in a list of reference pictures (e.g., "RefPicList0") for a reference region for the PU. The reference region for the PU may be a region, within a reference picture, that contains sample blocks that most closely corresponds to the sample blocks of the PU. The motion estimation unit may generate a reference index that indicates a position in RefPicList0 of the reference picture containing the reference region for the PU. In addition, the motion estimation unit may generate an MV that indicates a spatial displacement between a coding block of the PU and a reference location associated with the reference region. For instance, the MV may be a two-dimensional vector that provides an offset from the coordinates in the current decoded picture to coordinates in a reference picture. The motion estimation unit may output the reference index and the MV as the motion information of the PU. The motion compensation unit of inter-prediction processing unit 120 may generate the predictive blocks of the PU based on actual or interpolated samples at the reference location indicated by the motion vector of the PU.

If a PU is in a B slice, the motion estimation unit of inter-prediction processing unit 120 may perform uni-prediction or bi-prediction for the PU. To perform uni-prediction for the PU, the motion estimation unit may search the reference pictures of RefPicList0 or a second reference picture list ("RefPicList1") for a reference region for the PU. The motion estimation unit may output, as the motion information of the PU, a reference index that indicates a position in RefPicList0 or RefPicList1 of the reference picture that contains the reference region, an MV that indicates a spatial displacement between a prediction block of the PU and a reference location associated with the reference region, and one or more prediction direction indicators that indicate whether the reference picture is in RefPicList0 or RefPicList1. The motion compensation unit of inter-prediction processing unit 120 may generate the predictive blocks of the PU based at least in part on actual or interpolated samples at the reference region indicated by the motion vector of the PU.

To perform bi-directional inter prediction for a PU, the motion estimation unit may search the reference pictures in RefPicList0 for a reference region for the PU and may also search the reference pictures in RefPicList1 for another reference region for the PU. The motion estimation unit may generate reference picture indexes that indicate positions in RefPicList0 and RefPicList1 of the reference pictures that contain the reference regions. In addition, the motion estimation unit may generate MVs that indicate spatial displacements between the reference location associated with the reference regions and a sample block of the PU. The motion information of the PU may include the reference indexes and the MVs of the PU. The motion compensation unit of inter-prediction processing unit 120 may generate the predictive blocks of the PU based at least in part on actual or interpolated samples at the reference regions indicated by the motion vectors of the PU.

Video encoder 20 may be configured to perform palette-based coding. With respect to the HEVC framework, as an example, the palette-based coding techniques may be configured to be used as a coding unit (CU) mode. In other examples, the palette-based coding techniques may be configured to be used as a PU mode in the framework of HEVC. Accordingly, all of the disclosed processes described herein (throughout this disclosure) in the context of a CU mode may, additionally or alternatively, apply to PU. However, these HEVC-based examples should not be considered a restriction or limitation of the palette-based coding techniques described herein, as such techniques may be applied to work independently or as part of other existing or yet to be developed systems/standards. In these cases, the unit for palette coding can be square blocks, rectangular blocks or even regions of non-rectangular shape.

Palette-based encoding unit 122, for example, may perform palette-based decoding when a palette-based encoding mode is selected, e.g., for a CU or PU. For example, palette-based encoding unit 122 may be configure to generate a palette having entries indicating pixel values, select pixel values in a palette to represent pixels values of at least some positions of a block of video data, and signal information associating at least some of the positions of the block of video data with entries in the palette corresponding, respectively, to the selected pixel values. Although various functions are described as being performed by palette-based encoding unit 122, some or all of such functions may be performed by other processing units, or a combination of different processing units.

According to aspects of this disclosure, palette-based encoding unit 122 may be configured to perform any combination of the techniques for palette coding described herein. For example, palette-based encoding unit 122 may determine an input parameter for a truncated binary code that represents a palette index for a pixel based on a number of indices in the palette. Palette-based encoding unit 122 may distinguish between a first palette coding mode and a second palette coding mode based only on the prefix of the truncated binary code. For example, palette-based encoding unit 122 may not adjust the input parameter when encoding the truncated binary code for the index of a pixel.

In addition, palette-based encoding unit 122 may indicate a palette coding mode for a pixel (e.g., Escape mode or Copy Left mode) using only on a prefix of the truncated binary code. For example, according to aspects of this disclosure, a particular truncated binary code may be reserved for indicating that a pixel is coded as an escape pixel, such as a prefix code that has all bins that are equal to zero. If the current pixel is not encoded as an escape pixel, palette-based encoding unit 122 may be configured to encode data that indicates a run length of pixels being coded with the current pixel, as well as a suffix of the truncated binary code, if such a suffix exists based on the input parameter. In some examples, the suffix of the truncated binary code may follow data that indicates the run length in the bitstream.

Intra-prediction processing unit 126 may generate predictive data for a PU by performing intra prediction on the PU. The predictive data for the PU may include predictive blocks for the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. Intra-prediction processing unit 126 may use samples from sample blocks of neighboring PUs to generate a predictive block for a PU. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the region associated with the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks.

Residual generation unit 102 may generate, based on the luma, Cb and Cr coding block of a CU and the selected predictive luma, Cb and Cr blocks of the PUs of the CU, a luma, Cb and Cr residual blocks of the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Transform processing unit 104 may perform quad-tree partitioning to partition the residual blocks associated with a CU into transform blocks associated with TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information, thus quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118. For instance, the bitstream may include data that represents a RQT for a CU.

Figure 3:
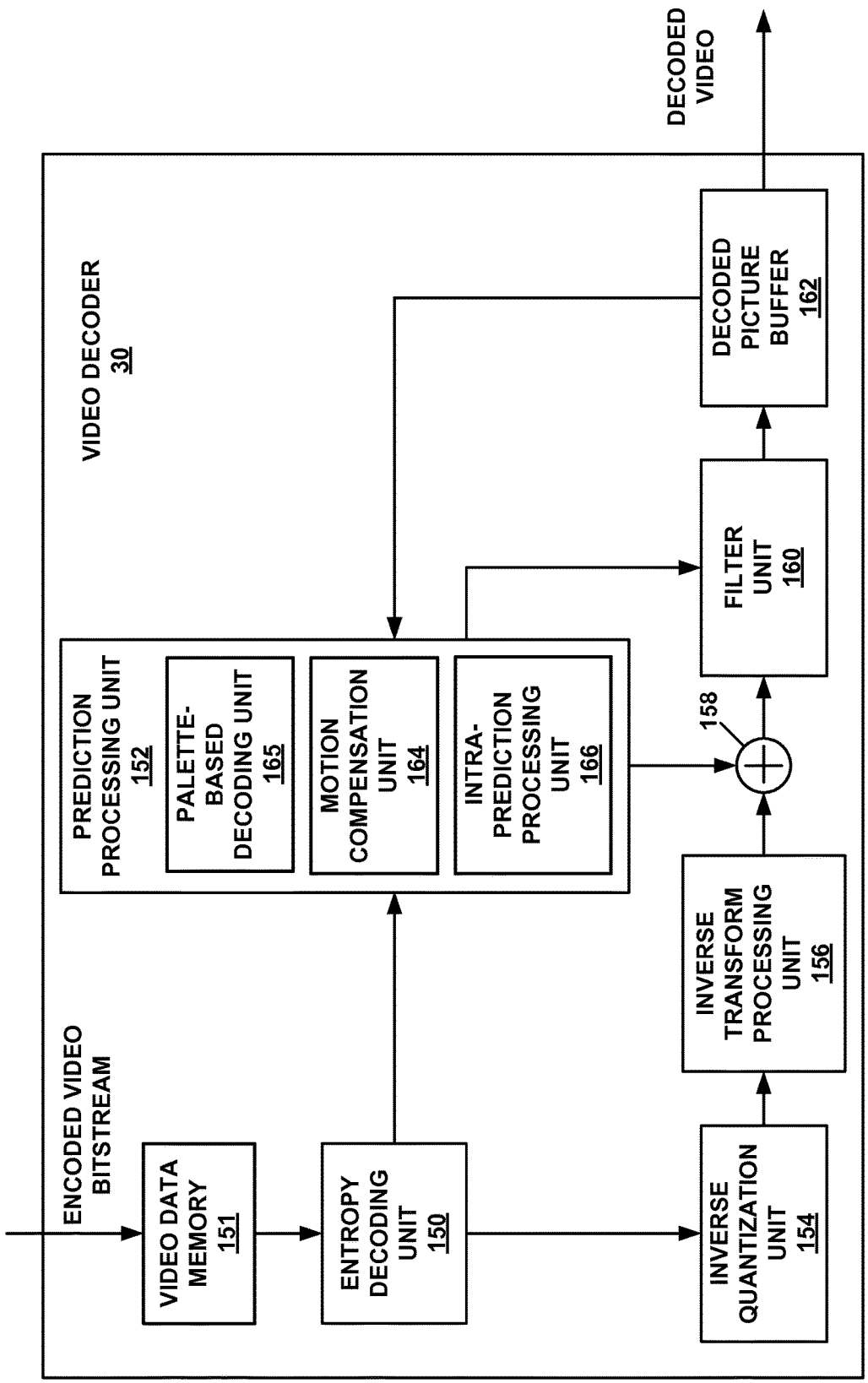
FIG. 3 is a block diagram illustrating an example video decoder that may implement the techniques described in this disclosure.

FIG. 3 is a block diagram illustrating an example video decoder 30 that is configured to implement the techniques of this disclosure. FIG. 3 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

Video encoder 20 represents an example of a device that may be configured to perform techniques for palette-based video coding in accordance with various examples described in this disclosure. For example, video encoder 20 may be configured to selectively decode various blocks of video data, such as CUs or PUs in HEVC coding, using either palette-based coding or non-palette based coding. Non-palette based coding modes may refer to various inter-predictive temporal coding modes or intra-predictive spatial coding modes, such as the various coding modes specified by HEVC Draft 10. Video decoder 30, in one example, may be configured to generate a palette having entries indicating pixel values, receive information associating at least some pixel locations in a block of video data with entries in the palette, select pixel values in the palette based on the information, and reconstruct pixel values of the block based on the selected pixel values in the palette.

In the example of FIG. 3, video decoder 30 includes an entropy decoding unit 150, video data memory 151, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. Video decoder 30 also includes a palette-based decoding unit 165 configured to perform various aspects of the palette-based coding techniques described in this disclosure. In other examples, video decoder 30 may include more, fewer, or different functional components.

Video data memory 151 may store video data, such as an encoded video bitstream, to be decoded by the components of video decoder 30. The video data stored in video data memory 151 may be obtained, for example, from a computer-readable medium, e.g., from a local video source, such as a camera, via wired or wireless network communication of video data, or by accessing physical data storage media. Video data memory 151 may form a coded picture buffer (CPB) that stores encoded video data from an encoded video bitstream. Decoded picture buffer 162 may be a reference picture memory that stores reference video data for use in decoding video data by video decoder 30, e.g., in intra- or inter-coding modes. Video data memory 151 and decoded picture buffer 162 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 151 and decoded picture buffer 162 may be provided by the same memory device or separate memory devices. In various examples, video data memory 151 may be on-chip with other components of video decoder 30, or off-chip relative to those components.

A coded picture buffer (CPB) may receive and store encoded video data (e.g., NAL units) of a bitstream. Entropy decoding unit 150 may receive encoded video data (e.g., NAL units) from the CPB and parse the NAL units to decode syntax elements. Entropy decoding unit 150 may entropy decode entropy-encoded syntax elements in the NAL units. Prediction processing unit 152, inverse quantization unit 154, inverse transform processing unit 156, reconstruction unit 158, and filler unit 160 may generate decoded video data based on the syntax elements extracted from the bitstream.

The NAL units of the bitstream may include coded slice NAL units. As part of decoding the bitstream, entropy decoding unit 150 may extract and entropy decode syntax elements from the coded slice NAL units. Each of the coded slices may include a slice header and slice data. The slice header may contain syntax elements pertaining to a slice. The syntax elements in the slice header may include a syntax element that identifies a PPS associated with a picture that contains the slice.

In addition to decoding syntax elements from the bitstream, video decoder 30 may perform a reconstruction operation on a non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 154 may inverse quantize, i.e., de-quantize, coefficient blocks associated with the TU. Inverse quantization unit 154 may use a QP value associated with the CU of the TU to determine a degree of quantization and, likewise, a degree of inverse quantization for inverse quantization unit 154 to apply. That is, the compression ratio, i.e., the ratio of the number of bits used to represent original sequence and the compressed one, may be controlled by adjusting the value of the QP used when quantizing transform coefficients. The compression ratio may also depend on the method of entropy coding employed.

After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 166 may perform intra prediction to generate predictive blocks for the PU. Intra-prediction processing unit 166 may use an intra-prediction mode to generate the predictive luma, Cb and Cr blocks for the PU based on the prediction blocks of spatially-neighboring PUs. Intra-prediction processing unit 166 may determine the intra prediction mode for the PU based on one or more syntax elements decoded from the bitstream.

Prediction processing unit 152 may construct a first reference picture list (RefPicList0) and a second reference picture list (RefPicList1) based on syntax elements extracted from the bitstream. Furthermore, if a PU is encoded using inter prediction, entropy decoding unit 150 may extract motion information for the PU. Motion compensation unit 164 may determine, based on the motion information of the PU, one or more reference regions for the PU. Motion compensation unit 164 may generate, based on samples blocks at the one or more reference blocks for the PU, predictive lama, Cb and Cr blocks for the PU.

Reconstruction unit 158 may use the luma, Cb and Cr transform blocks associated with TUs of a CU and the predictive luma, Cb and Cr blocks of the PUs of the CU, i.e., either intra-prediction data or inter-prediction data, as applicable, to reconstruct the luma, Cb and Cr coding blocks of the CU. For example, reconstruction unit 158 may add samples of the luma, Cb and Cr transform blocks to corresponding samples of the predictive luma, Cb and Cr blocks to reconstruct the luma, Cb and Cr coding blocks of the CU.

Filter unit 160 may perform a deblocking operation to reduce blocking artifacts associated with the luma, Cb and Cr coding blocks of the CU. Video decoder 30 may store the luma, Cb and Cr coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the luma, Cb, and Cr blocks in decoded picture buffer 162, intra prediction or inter prediction operations on PUs of other CUs.

Video decoder 30 may be configured to perform palette-based coding. Palette-based decoding unit 165, for example, may perform palette-based decoding when a palette-based decoding mode is selected, e.g., for a CU or PU. For example, palette-based decoding unit 165 may be configured to generate a palette having entries indicating pixel values, receive information associating at least some pixel locations in a block of video data with entries in the palette, select pixel values in the palette based on the information, and reconstruct pixel values of the block based on the selected pixel values in the palette. Although various functions are described as being performed by palette-based decoding unit 165, some or all of such functions may be performed by other processing units, or a combination of different processing units.

Palette-based decoding unit 165 may receive palette coding mode information, and perform the above operations when the palette coding mode information indicates that the palette coding mode applies to the block. When the palette coding mode information indicates that the palette coding mode does not apply to the block, or when other mode information indicates the use of a different mode, prediction processing unit 152 decodes the block of video data using a non-palette based coding mode, e.g., such an HEVC inter-predictive or intra-predictive coding mode. The block of video data may be, for example, a CU or PU generated according to an HEVC coding process. The palette-based coding mode may comprise one of a plurality of different palette-based coding modes, or there may be a single palette-based coding mode.

According to aspects of this disclosure, palette-based decoding unit 165 may be configured to perform any combination of the techniques for palette coding described herein. For example, palette-based decoding unit 165 may determine an input parameter for a truncated binary code that represents a palette index for a pixel based on a number of indices in the palette. Palette-based decoding unit 165 may distinguish between a first palette coding mode and a second palette coding mode based only on the prefix of the truncated binary code. For example, palette-based decoding unit 165 may not adjust the input parameter when decoding the truncated binary code for the index of a pixel.

In addition, palette-based decoding unit 165 may determine a palette coding mode for a pixel (e.g., Escape mode or Copy Left mode) based only on a prefix of the truncated binary code. For example, according to aspects of this disclosure, a particular truncated binary code may be reserved for indicating that a pixel is coded as an escape pixel, such as a prefix code that has all bins that are equal to zero. If the current pixel is not decoded as an escape pixel, palette-based decoding unit 165 may be configured to decode data that indicates a run length of pixels being coded with the current pixel, as well as a suffix of the truncated binary code, if such a suffix exists based on the input parameter. In some examples, the suffix of the truncated binary code may follow data that indicates the run length in the bitstream.

Figure 4:
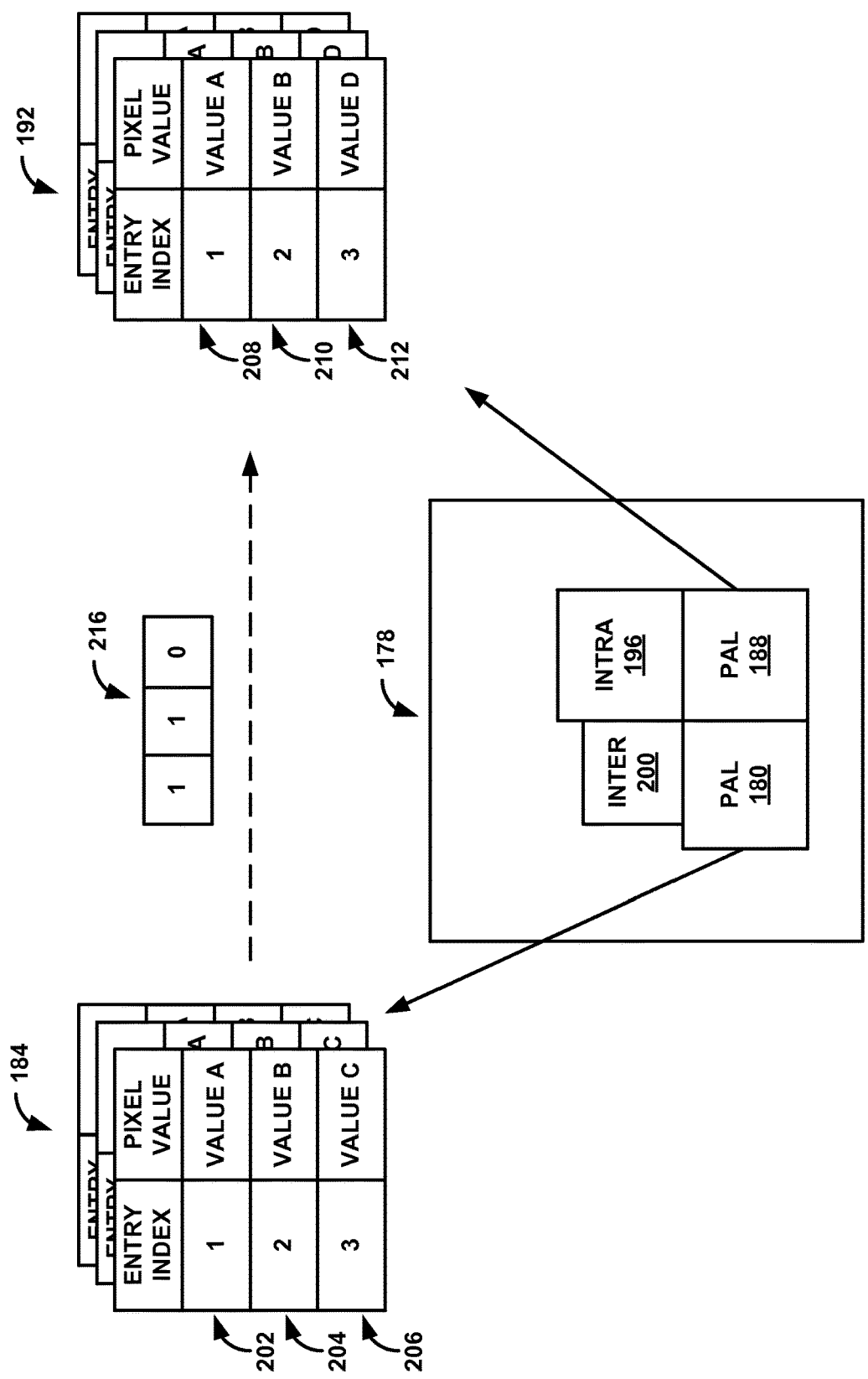
FIG. 4 is a conceptual diagram illustrating an example of determining palette entries for palette-based video coding, consistent with techniques of this disclosure.

FIG. 4 is a conceptual diagram illustrating an example of determining a palette for coding video data, consistent with techniques of this disclosure. The example of FIG. 4 includes a picture 178 having a first coding unit (CU) 180 that is associated with first palettes 184 and a second CU 188 that is associated with second palettes 192. First CU 180 and second CU 188 are coded using a palette mode (PAL). As described in greater detail below and in accordance with the techniques of this disclosure, second palettes 192 are based on first palettes 184. Picture 178 also includes block 196 coded with an intra-prediction coding mode and block 200 that is coded with an inter-prediction coding mode.

The techniques of FIG. 4 are described in the context of video encoder 20 (FIG. 1 and FIG. 2) and video decoder 30 (FIG. 1 and FIG. 3) and with respect to the HEVC video coding standard for purposes of explanation. However, it should be understood that the techniques of this disclosure are not limited in this way, and may be applied by other video coding processors and/or devices in other video coding processes and/or standards.

In general, a palette refers to a number of pixel values that are dominant and/or representative for a CU currently being coded, second CU 188 in the example of FIG. 4. First palettes 184 and second palettes 192 are shown as including multiple palettes. In some examples, according to aspects of this disclosure, a video coder (such as video encoder 20 or video decoder 30) may code palettes separately for each color component of a CU. For example, video encoder 20 may encode a palette for a luma (Y) component of a CU, another palette for a chroma (U) component of the CU, and yet another palette for the chroma (V) component of the CU. In this example, entries of the Y palette may represent Y values of pixels of the CU, entries of the U palette may represent U values of pixels of the CU, and entries of the V palette may represent V values of pixels of the CU.

In other examples, video encoder 20 may encode a single palette for all color components of a CU. In this example, video encoder 20 may encode a palette having an i-th entry that is a triple value, including Yi, Ui, and Vi. In this case, the palette includes values for each of the components of the pixels. Accordingly, the representation of first palettes 184 and second palettes 192 as a set of palettes having multiple individual palettes is merely one example and not intended to be limiting.

In the example of FIG. 4, each of first palettes 184 include three entries 202-206 having entry index value 1, entry index value 2, and entry index value 3, respectively. Entries 202-206 relate the index values to pixel values including pixel value A, pixel value B, and pixel value C, respectively. As described herein, rather than coding the actual pixel values of first CU 180, a video coder (such as video encoder 20 or video decoder 30) may use palette-based coding to code the pixels of the block using the indices 1-3. That is, for each pixel position of first CU 180, video encoder 20 may encode an index value for the pixel, where the index value is associated with a pixel value in one or more of first palettes 184. Video decoder 30 may obtain the index values from a bitstream and reconstruct the pixel values using the index values and one or more of first palettes 184. Thus, first palettes 184 are transmitted by video encoder 20 in an encoded video data bitstream for use by video decoder 30 in palette-based decoding.

In some examples, video encoder 20 and video decoder 30 may determine second palettes 192 based on first palettes 184. For example, video encoder 20 and/or video decoder 30 may locate one or more blocks from which the predictive palettes, in this example, first palettes 184, are determined. The combination of entries being used for purposes of prediction may be referred to as a predictor palette.

In the example of FIG. 4, second palettes 192 include three entries 208-212 having entry index value 1, entry index value 2, and entry index value 3, respectively. Entries 208-212 differ slightly from entries 202-206 of first palettes 184 and relate indices 1-3 to pixel values including pixel value A, pixel value B, and pixel value D, respectively. In this example, video encoder 20 may code one or more syntax elements indicating which entries of first palettes 184 (representing a predictor palette, although the predictor palette may include entries of a number of blocks) are included in second palettes 192.

In the example of FIG. 4, the one or more syntax elements are illustrated as a vector 216. Vector 216 has a number of associated bins (or bits), with each bin indicating whether the palette predictor associated with that bin is used to predict an entry of the current palette. For example, vector 216 indicates that the first two entries of first palettes 184 (202 and 204) are included in second palettes 192 (a value of "1" in vector 216), while the third entry of first palettes 184 is not included in second palettes 192 (a value of "0" in vector 216). In the example of FIG. 4, the vector is a Boolean vector. The vector may be referred to as a palette prediction vector.

In some examples, video encoder 20 and video decoder 30 may determine a palette predictor list (which may also be referred to as a palette predictor table) when performing palette prediction. The palette predictor list may include entries from palettes of one or more neighboring blocks that are used to predict one or more entries of a palette for coding a current block. Video encoder 20 and video decoder 30 may construct the list in the same manner. Video encoder 20 and video decoder 30 may code data (such as vector 216) to indicate which entries of the palette predictor list are to be included in a palette for coding a current block.

Figure 5:
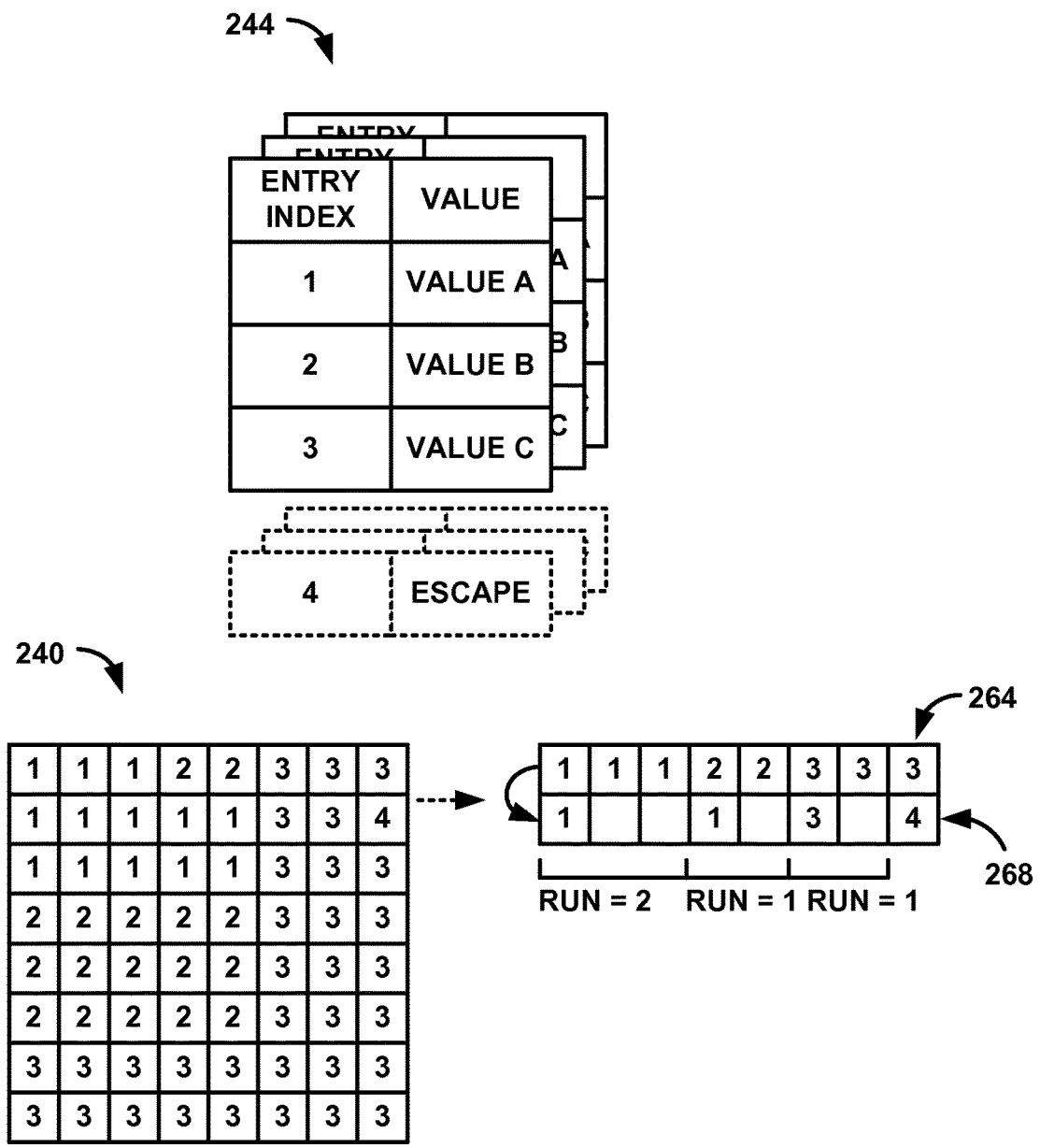
FIG. 5 is a conceptual diagram illustrating an example of determining indices to a palette for a block of pixels, consistent with techniques of this disclosure.

FIG. 5 is a conceptual diagram illustrating an example of determining palette indices to a palette for a block of pixels, consistent with techniques of this disclosure. For example, FIG. 5 includes a map 240 of palette indices that relate respective positions of pixels associated with the palette indices to an entry of palettes 244. For example, index 1 is associated with Value A, index 2 is associated with Value B, and index 3 is associated with Value C. In addition, when escape samples are indicated using implicit escape signaling, video encoder 20 and video decoder 30 may also add an additional index to palettes 244, illustrated in FIG. 5 as index 4, which may indicate that samples of map 240 associated with index 4 are escape samples. In this case, video encoder 20 may encode (and video decoder 30 may obtain, from an encoded bitstream) an indication of an actual pixel value (or its quantized version) for a position in map 240 if the pixel value is not included in palettes 244.

In some examples, video encoder 20 and video decoder 30 may be configured to code an additional map indicating which pixel positions are associated with palette indices. For example, assume that the (i, j) entry in the map corresponds to the (i, j) position of a CU. Video encoder 20 may encode one or more syntax elements for each entry of the map (i.e., each pixel position) indicating whether the entry has an associated index value. For example, video encoder 20 may encode a flag having a value of one to indicate that the pixel value at the (i, j) location in the CU is one of the values in palettes 244. Video encoder 20 may, in such an example, also encode a palette index (shown in the example of FIG. 5 as values 1-3) to indicate that pixel value in the palette and to allow video decoder to reconstruct the pixel value.

In instances in which palettes 244 include a single entry and associated pixel value, video encoder 20 may skip the signaling of the index value. Video encoder 20 may encode the flag to have a value of zero to indicate that the pixel value at the (i, j) location in the CU is not one of the values in palettes 244. In this example, video encoder 20 may also encode an indication of the pixel value for use by video decoder 30 in reconstructing the pixel value. For example, video encoder 20 may explicitly code the pixel value. In some instances, the pixel value may be coded in a lossy manner.

The value of a pixel in one position of a CU may provide an indication of values of one or more other pixels in other positions of the CU. For example, there may be a relatively high probability that neighboring pixel positions of a CU will have the same pixel value or may be mapped to the same index value (in the case of lossy coding, in which more than one pixel value may be mapped to a single index value).

Accordingly, video encoder 20 may encode one or more syntax elements indicating a number of consecutive pixels or palette indices in a given scan order that are coded together. As noted above, the string of palette indices (or pixel values indicated by the palette indices) may be referred to herein as a run. Video decoder 30 may obtain the syntax elements indicating a run from an encoded bitstream and use the data to determine the number of consecutive locations that have the same pixel or index value.

As noted above, runs may be used in conjunction with a Copy Top mode or Copy Left mode. In an example for purposes of illustration, consider rows 264 and 268 of map 240. Assuming a horizontal, left to right scan direction, row 264 includes three palette indices of "1," two palette indices of "2," and three palette indices of "3 ." Row 268 includes five palette indices of "1," two palette indices of "3," and one sample that is not included palettes 244 (represented by index 4), which may be referred to as an escape sample.

In this example, video encoder 20 may use Copy Top mode to encode data for row 268. For example, video encoder 20 may encode one or more syntax elements indicating that the first position of row 268 (the left most position of row 268) is the same as the first position of row 264. Video encoder 20 may also encode one or more syntax elements indicating that the next run of two consecutive entries in the scan direction in row 268 is the same as the first position of row 264.

After encoding the one or more syntax elements indicating the first position of row 264 and the run of two entries (noted above), video encoder 20 may encode the fourth and fifth positions in row 268 (from left to right), using Value mode. For example, video encoder 20 may encode one or more syntax elements indicating a value of 1 for the fourth position and one or more syntax elements indicating a run of 1 (e.g., Value mode). Hence, video encoder 20 encodes these two positions without reference to another line.

Video encoder 20 may then encode the first position having an index value of 3 in row 268 using Copy Top mode relative to upper row 264. For example, video encoder 20 may signal a Copy Top mode and a run of 1. Accordingly, video encoder 20 may select between coding pixel values or palette indices of a line relative to other values of the line, e.g., using a run, coding pixel values or palette indices of a line relative to values of another line (or column), or a combination thereof. Video encoder 20 may, in some examples, perform a rate/distortion optimization to make the selection.

Video encoder 20 may then encode the escape sample for the final sample of row 268 (from left to right), which is not included in palettes 244. For example, video encoder 20 may encode the final position of row 268 as an escape sample. That is, video encoder 20 may encode an indication that the final position of row 268 is an escape sample (e.g., index 4), as well as an indication of the sample value. Video decoder 30 may obtain the above-described syntax from an encoded bitstream and reconstruct row 268 using such syntax.

In one example, to signal an code an escape sample, video encoder 20 and video decoder 30 may add an additional index to palettes 244 (entry index 4). Video encoder 20 and video decoder 30 may use the additional index to palettes 244 to indicate that a sample is coded as an escape sample, e.g., index 4. The additional index, however, does not have an associated color value. Rather, video encoder 20 and video decoder 30 also code color values for each sample that is associated with the additional index. If the sample is not coded as an escape sample, video encoder 20 and video decoder 30 may code data to indicate whether the mode is Copy Top mode or Copy Left mode, such as a palette_mode syntax element.

In some examples, video encoder 20 and video decoder 30 may be configured to code one or more block-level syntax elements that indicate, for all samples of a block of video data, whether at least one sample of the block is coded based on a color value not being included in a palette of colors for the block. With respect to the example of FIG. 5, video encoder 20 and video decoder 30 may code one or more syntax elements associated with map 240 that indicate that at least one sample of map 240 is coded as an escape sample, i.e., the final sample of row 268.

In an example, the one or more syntax elements may be a block-level escape flag. For example, video encoder 20 may encode an escape flag having a value of one to indicate that map 240 includes a sample coded as an escape sample. Likewise, video decoder 30 may decode an escape flag having a value of one, which indicates that map 240 includes a sample coded as an escape sample. Accordingly, video encoder 20 may encode and video decoder 30 may decode map 240 in accordance with the escape flag. For example, video encoder 20 and video decoder 30 may add index 4 to palettes 244, which may be used to represent samples coded as escape samples. Video encoder 20 and video decoder 30 may use this additional index during coding of map 240.

As an example, video decoder 30 may parse data for a palette coded block associated with map 240 from a bitstream. Video decoder 30 may decode a block-level escape flag for the block, which indicates whether one or more samples in the block may be coded as escape pixels. If the block-level escape flag indicates that there may be samples coded as escape samples, video decoder 30 may add index 4 to palettes 244. Video decoder 30 may also, for samples that are not coded in a run of other samples (e.g., samples being explicitly coded, such as those described above with respect to row 264 and row 268), video decoder 30 may decode one or more syntax elements that indicate a palette coding mode (e.g., such as a palette_mode flag).

In the example above, video decoder 30 may also decode a palette index for the samples. Video decoder 30 may use the decoded palette index to determine how to decode the sample value for the sample being decoded. For example, if the sample has an index of 4 (e.g., the index associated with escape samples), video decoder 30 may determine that the sample is an escape coded sample and may decode the sample value for the sample. If the sample has any index other than 4, video decoder 30 may determine the appropriate sample value from palettes 244 based on the decoded index. Video decoder 30 may also decode one or more syntax elements that indicate a run of other samples being coded with the current sample in a given scan order. Video decoder 30 may decode the index using a truncated binary code having an input parameter that is equal to the size of palettes 244, e.g., four indices. The resulting truncated binary code may include a prefix and a suffix (e.g., a trailing one or zero).

According to aspects of this disclosure, video decoder 30 may distinguish between whether the sample being decoded has an index of 4 (e.g., the sample is decoded as an escape sample) or the sample is being decoded according to another palette coding mode (e.g., the sample is decoded using a Copy Left palette coding mode) based only on the prefix of the truncated binary code. For example, video decoder 30 may not adjust the input parameter prior to decoding the truncated binary code and decoding the prefix of the truncated binary code. In addition, video decoder 30 may assign escape index 4 to a particular codeword of the truncated binary code. For example, video decoder 30 may assign escape index 4 to a prefix having all bins that are equal to zero.

In the example above, after decoding a prefix that has all bins that are equal to zero, video decoder 30 may determine that the index of the sample being decoded is index 4 and may determine that the sample being decoded is an escape sample. Accordingly, video decoder 30 may decode a sample value for the sample. After decoding a prefix having any other value, video decoder 30 may decode a run length of samples being decoded with the current sample.

In some instances, according to aspects of this disclosure, video decoder 30 may be configured to decode one or more syntax elements between the prefix of the truncated binary code and a suffix of the truncated binary code, if such a suffix exists. In this way, video decoder 30 may decode the index in parallel with other syntax, such as syntax that indicates a run length of samples being decoded with the current sample. For example, video decoder 30 may decode a prefix of the truncated binary code that indicates the index for the current sample. In instances in which the prefix indicates that the sample is not decoded as an escape sample (e.g., the sample is decoded using another palette coding mode, such as Copy Top mode or Copy Left mode), video decoder 30 may decode run length syntax, which follows the prefix of the truncated binary code in the bitstream. Video decoder 30 may also decode the suffix of the truncated binary code, which follows the run length syntax, in parallel with the run length syntax.

Figure 6:
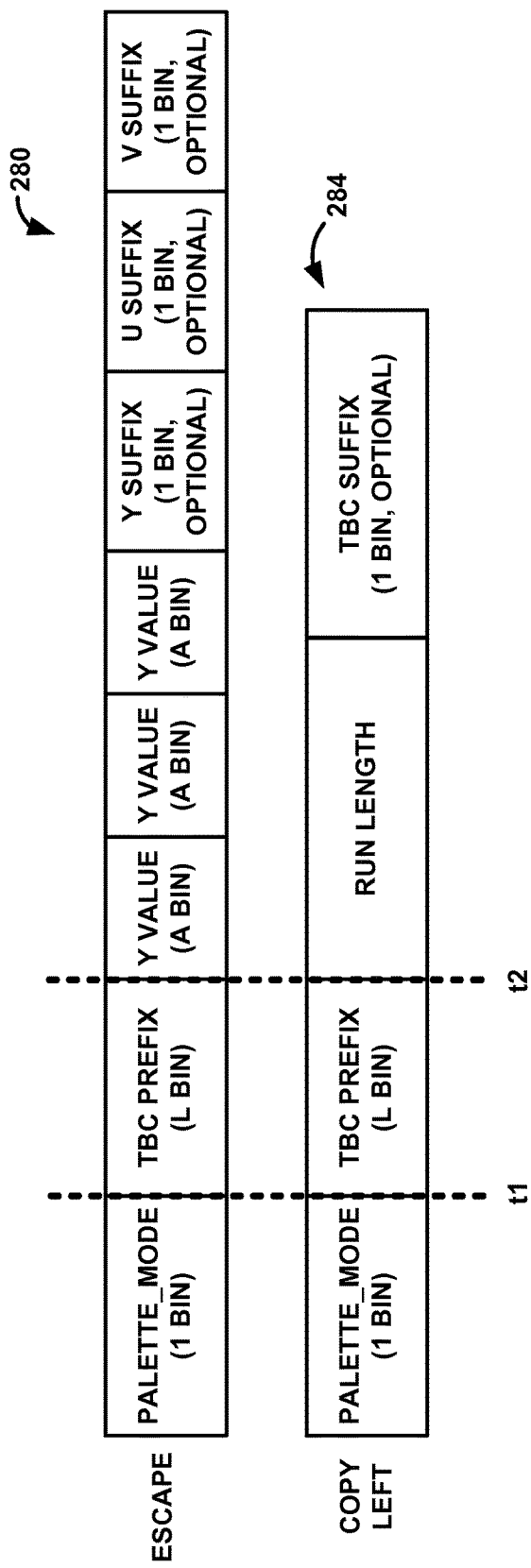
FIG. 6 is a conceptual diagram illustrating two example bitstreams containing data for palette coding, consistent with the techniques of this disclosure.

FIG. 6 is a conceptual diagram illustrating two example bitstreams containing data for palette coding, consistent with the techniques of this disclosure. For example, FIG. 6 illustrates the relative positions of bits (bins) that may be included in a bitstream that represents palette coded video data. In particular, the example of FIG. 6 includes a first bitstream 280 illustrating the relative position of bins for coding a pixel with Escape mode and a second bitstream 284 illustrating the relative position of bins for coding a pixel with Copy Left mode.

As described above, a video encoder (such as video encoder 20) may encode a CU level escape flag in the bitstream that specifies whether Escape mode is enabled for a CU currently being encoded (a current CU). For example, video encoder 20 may set a flag that indicates whether the current CU may have a pixel coded as an escape pixel.

For a pixel contained within the current CU, video encoder 20 may encode one or more syntax elements that indicate a palette coding mode for the pixel. In the example of FIG. 6, the one or more syntax elements that indicates a palette coding mode is represented by the palette_mode syntax element (1 bin), which is encoded for both the first bitstream 280 and the second bitstream 284.

In some instances, pixels encoded as escape pixels and pixels encoded with the Copy Left mode may share the same palette_mode syntax element value. For example, a palette_mode syntax element equal to zero may indicate that a current pixel is encoded or decoded with Copy Above mode, while a palette_mode syntax element equal to one may indicate that the current pixel is encoded or decoded with Copy Left or Escape mode. In this example, video encoder 20 and video decoder 30 may then determine whether the current pixel is encoded or decoded with Copy Left mode or Escape mode based on the palette index of the current pixel.

For example, video encoder 20 may encode a number of palette indices for the CU, with a largest index N. In instances in which the Escape mode is not enabled (e.g., the CU level escape flag indicates that no pixels are encoded as escape pixels), video encoder 20 may select an index for coding the pixels of the CU from the set of indices {0, 1, . . . , N}, inclusively. By selecting an index in the set of {0, 1, . . . , N}, video encoder 20 also implicitly signals that Copy Left mode is used to encode the current pixel, and further encodes one or more syntax elements that indicate run length for Copy Left mode. Video decoder 30 may perform a reciprocal process (e.g., parse the palette mode syntax element, parse the palette index, determine the palette mode, and decode the pixel as well as pixels of a run).

In instances in which Escape mode is enabled (e.g., a CU level escape flag indicates that there may be an escape pixel in the current block), video encoder 20 may select an index for coding the pixels of the CU from the set of indices {0, 1, . . . , N, N+1}, where an index equal to N+1 indicates that the current pixel is coded as an escape pixel. In such instances, video encoder 20 may encode a number of additional syntax elements to indicate the quantized pixel values for the escape pixel. Video decoder 30 may determine that the index obtained from the bitstream is equal to N+1 and decode the pixel values for the escape pixel.

In the example above, video decoder 30 parses and decodes different syntax elements based on whether the decoded index is equal to N+1 or not. For example, when the index is equal to N+1, video decoder 30 may parse and decode the escape pixel values. When the index is not equal to N+1, video decoder 30 may parse and decode the index value and an indication of a run associated with the index value.

In some examples, video encoder 20 and video decoder 30 may encode and decode, respectively, the palette index (e.g., to determine whether the index is equal to N+1 or another index of the palette) using a truncated binary code. Video encoder 20 and video decoder 30 may determine an input parameter to the truncated binary code that indicates the index based on a size of the palette for a pixel currently being encoded or decoded. The resulting truncated binary code may include a prefix and a suffix, where the total codeword length may be k or k+1 (where the final bin may be referred to as a trailing bin).

In some examples, video encoder 20 and video decoder 30 may determine an input parameter P to the truncated binary code that is equal to the maximum palette entry index N if there is no escape pixel for a block currently being coded (e.g., a current CU). The parameter P may be equal to a palette index plus one (N+1) if there may be an escape pixel in the current block.

However, certain redundancy removal and/or efficiency processes may impact the above-described input parameter P. For example, a redundancy removal process developed in the standard submission document JCTVC-R0065 for reducing the number of bits needed to represent a palette index includes determining whether the values of neighboring pixels of a current pixel satisfy a particular condition. In this redundancy removal process, if the particular condition is satisfied, video encoder 20 and video decoder 30 may reduce the input parameter P for determining the truncated binary code by one in order to reduce the number of bits necessary for representing the index (thereby achieving a bit savings).

In the example above, there are two possibilities for the value of the input parameter P when the current block may have an escape pixel (e.g., the size of the palette is N+1), depending on neighboring pixel values. A first possibility (referred to as case one) is an unadjusted input parameter P that is equal to N+1. Another possibility (referred to as case two) is a reduced input parameter P that is equal to N.

When using truncated binary coding, an escape pixel index is coded using $\lceil \log_2(N+1) \rceil$ bins for case one and $\lceil \log_2 N+2 \rceil$ bins for case two. This divergence may impact the ability to encode and decode syntax elements in parallel. For example, to decode a bin string for a current pixel (e.g., such as bin strings of first bitstream 280 and second bitstream 284), video decoder 30 may sequentially perform the following process:

Step 1: Determine the input parameter P based on whether case one occurs or case two occurs and based on neighboring pixel and/or index values.

Step 2: Parse the $\lfloor \log_2(P+1) \rfloor$ bins from the bitstream and decode the corresponding value.

Step 3: Depending on the decoded value, determine whether there is one more trailing bin in the bit stream. If it exists, parse it and decode the pre-adjusted index value.

Step 4: If case one, make necessary adjustment to the pre-adjusted index value to determine the final decoded index value.

Step 5: If index value is equal to N+1, parse and decode escape pixel syntax (for Escape mode). Else, parse and decode run length syntax (for Copy Left mode).

While Step 4 and Step 5 are performed sequentially in the example above, in some instances, Step 4 and Step 5 of the process may be performed in parallel, because if the pre-adjusted index value is equal to P (e.g., an all one codeword "111 . . . 111" of variable length), then the current pixel is in escape mode.

The techniques of this disclosure may be used to reduce inter syntax dependency and increase parallelism. For example, according to aspects of this disclosure, an all zero codeword may be reserved for escape pixels. In the example of FIG. 6, video encoder 20 and video decoder 30 may be configured to encode and decode, respectively, an all zero codeword for the TBC PREFIX (L BIN) of first bitstream 280. In this example, video encoder 20 and video decoder 30 may be configured to assign an index that indicates a pixel is coded as an escape pixel (e.g., index N+1 in the example above) to a prefix of a truncated binary code having all bins equal to zero. Accordingly, video decoder 30 may identify that a particular pixel is encoded as an escape pixel upon parsing and decoding a truncated binary code having all bins equal to zero.

Additionally or alternatively, according to aspects of this disclosure, when the index of a pixel being coded is an index other than the index for escape pixel coding (e.g., when $N=2^k-1$, k=0, 1, 2, 3, . . . ) and one or more escape pixels exist in the current CU, processes that may impact the input parameter to a truncated binary code for a palette index may be disabled. In the example of FIG. 6, video encoder 20 and video decoder 30 may be configured to determine TBC PREFIX (L BIN) of second bitstream 284 without adjusting the input parameter for the truncated binary code based on pixel values and/or indices of neighboring pixels. In this example, video encoder 20 and video decoder 30 may be configured to determine an input parameter for a truncated binary code that represents a palette index for a pixel of a block of video data based only on a number of indices in the palette.

As one particular example, video encoder 20 and video decoder 30 may be configured to disable the redundancy removal process described in JCTVC-R0065 when determining the input parameter. In such an example, the input parameter for truncated binary coding may be N+1. In other examples, video encoder 20 and video decoder 30 may be configured to apply an index adjustment process, such as the index adjustment of JCTVC-R0065 to adjust the index value for the pixel, but may be configured to disable any adjustment to input parameter P for determining the truncated binary code.

Additionally or alternatively, according to aspects of this disclosure, when a truncated binary code includes a trailing suffix bin, video encoder 20 and video decoder 30 may be configured to include the suffix at the end of the bitstream (e.g., such as TBC SUFFIX (1 BIN, OPTIONAL) of second bitstream 284). For example, if $\lfloor \log_2(P+1) \rfloor + 1$ is equal to $\lceil \log_2(P+1) \rceil$, video encoder 20 and video decoder 30 may be configured to encode or decode, respectively, the trailing suffix bin of the truncated binary code at the end of the bin string. In the example above, as illustrated by second bitstream 284, the last bin TBC SUFFIX (1 BIN, OPTIONAL) may be included after the run length syntax in Copy Left mode, when the last bin exists. In a similar way, with respect to first bitstream 280, the last bins of the quantized escape pixel values (Y SUFFIX, U SUFFIX, V SUFFIX) may also be included at the end of the bin string.

According to aspects of this disclosure, by performing the processes above, the index of the escape pixel may always have an all zero codeword '000 . . . 000' with length $L = \lfloor \log_2(N+2) \rfloor$. For example, the number of zeros for an escape pixel index (e.g., index N+1) may be equal to $\lfloor \log_2(N+2) \rfloor$). Hence, video encoder 20 and video decoder 30 may determine an input parameter for a truncated binary code that represents a palette index for a pixel of a block of video data based on a number of indices in the palette, coding a prefix of the truncated binary code, and determining a palette coding mode for the pixel from a first palette coding mode and a second palette coding mode based only on the prefix of the truncated binary code.

First bitstream 280 and second bitstream 284 illustrate example bitstreams that are consistent with the techniques of this disclosure. In an example, first bitstream 280 and second bitstream 284 may be used to represent a palette coded pixel when palette_mode[xC][yC] is not equal to Copy Above mode. As described above, in the example of FIG. 6, L is a known value which may depend only on palette size. That is, the length L does not depend on neighboring index values.

According to aspects of this disclosure, video encoder 20 and video decoder 30 may encode and decode, respectively, certain syntax elements of first bitstream 280 and second bitstream 284 in parallel. As an example, video decoder 30 may perform the following steps to decode first bitstream 280 and second bitstream 284:

Step 1: Parse and decode the first $\lfloor \log_2(N+2) \rfloor$ bypass coded bins (TBC PREFIX (L BIN)). If all bins have a zero value, go to Step 2.1 to decode first bitstream 280 for a pixel coded with Escape mode; else go to Step 2.2 to decode second bitstream 284 for a pixel coded with Copy Left mode.

Step 2.1: Parse and decode the three quantized escape pixel values (Y VALUE (A BIN), U VALUE (A BIN), and V VALUE (A BIN)) in parallel. Then decode the optional trailing bin of the truncated binary code Y SUFFIX (1 BIN, OPTIONAL), U SUFFIX (1 BIN, OPTIONAL), and V SUFFIX (1 BIN, OPTIONAL).

Step 2.2: Issue Steps 2.2.1 and 2.2.2 in parallel:

Step 2.2.1: Depending on the first $\lfloor \log_2(N+2) \rfloor$ bypass coded bins and input parameter P, determine whether there is one more trailing bin in the bit stream (TBC SUFFIX, (1 BIN, OPTIONAL)). If the trailing bin exists, parse the bin and decode the final index value. For example, determine the index for the pixel based on TBC prefix and TBC suffix. If the trailing bin does not exist (e.g., the truncated binary code does not have a suffix bin based on the input parameter), determine the index value based on TBC prefix alone.

Step 2.2.2: Decode data that indicates a run length of a run of pixels being decoded with the current pixel (RUN LENGTH).

The above techniques may simplify the escape pixel decoding process and improve decoder throughput. For example, according to aspects of this disclosure, a palette coding mode may be determined based solely on the size of the palette for the block currently being coded (e.g., the length of the code for the number of indices, which may be based on the quantity of indices in the palette). For example, when using a truncated binary coding to decode a number of indices N, video decoder 30 may determine the length L based only on the number of indices N according to the following equation: $L = \lfloor \log_2(N+2) \rfloor$. In addition, according to aspects of this disclosure, a palette index value (e.g., an index value of a Copy Left mode) and the run length syntax may be encoded or decoded in parallel. The techniques described above may be enabled when k is larger than a predetermined value, where k indicates the number of indices N, as noted above. For example, the condition can require k>0.

Figure 7:
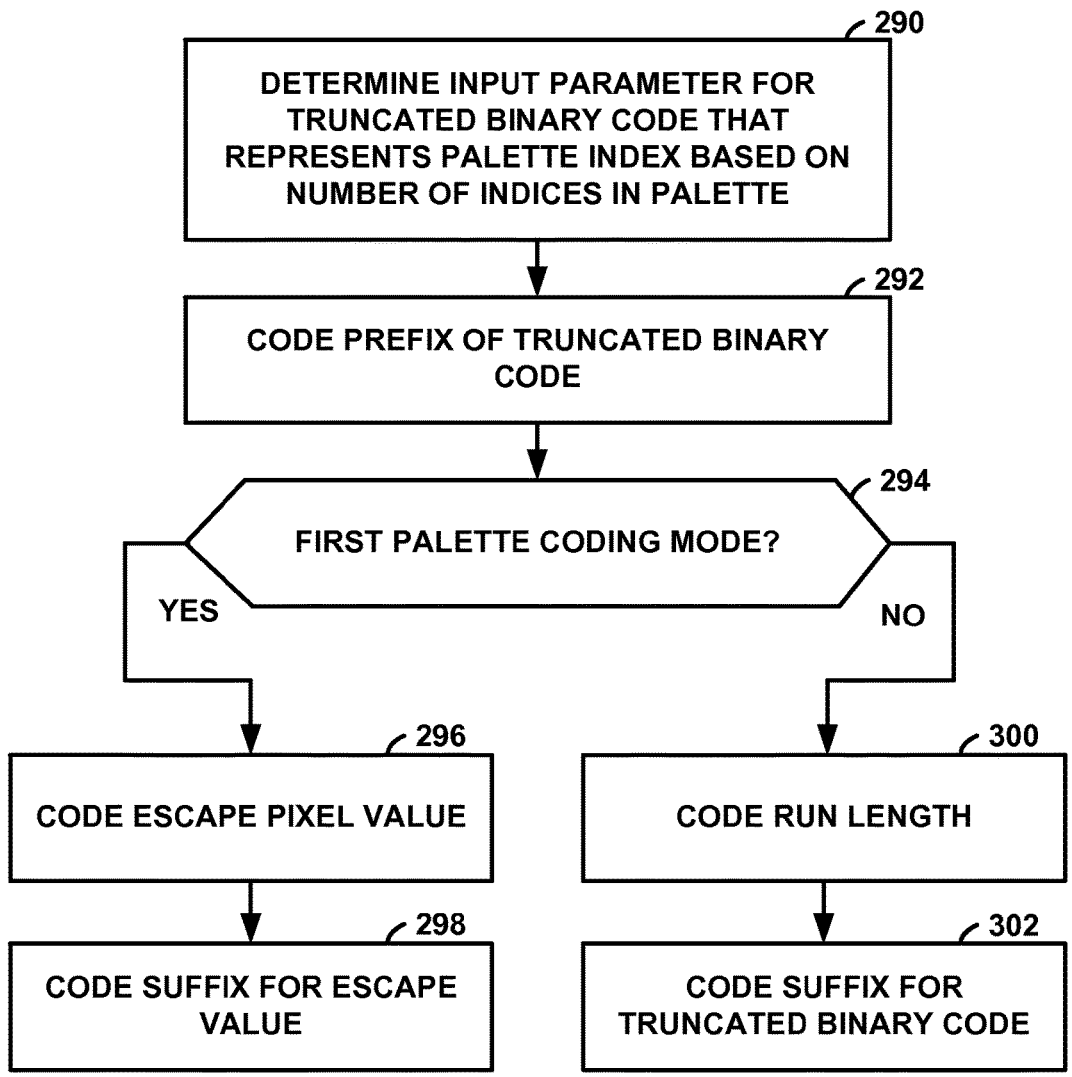
FIG. 7 is a flow chart that illustrates a process for coding palette coded data, consistent with the techniques of this disclosure.

FIG. 7 is a flow chart that illustrates a process for coding palette coded data, consistent with the techniques of this disclosure. The process of FIG. 7 is described with respect to a video coder, which may include video encoder 20, video decoder 30, or a variety of other processors configured to encode or decode video data.

In the example of FIG. 7, the video coder may determine an input parameter for a truncated binary code that represents a palette index for a pixel based on a number of indices in the palette (290). According to aspects of this disclosure, the video coder may determine the input parameter for the truncated binary code without adjusting the number of indices in the palette. For example, for a block that may include one or more pixels that are coded as escape pixels, the video coder may determine that the input parameter based on a palette size equal to N+1, where N is the number of indices of palette for the block that have corresponding color values.

The video coder may also code (encode or decode) a prefix of the truncated binary code (292). For example, video encoder 20 may encode the prefix of the truncated binary code. Likewise, video decoder 30 may decode the prefix of the truncated binary code.

The video coder then determines a palette coding mode for the pixel from a first palette coding mode and a second palette coding mode based only on the prefix of the truncated binary code (294). As an example, the video coder may determine whether the pixel currently being coded is encoded as an escape pixel (e.g., the first palette coding mode is Escape mode), or whether the pixel is encoded using Copy Left mode (e.g., the second palette coding mode is Copy Left mode) based only on the prefix of the truncated binary code. While Escape mode and Copy Left mode are described with respect to FIG. 7 as examples, it should be understood that other palette coding modes may be applicable in other examples.

According to aspects of this disclosure, the video coder may determine that the palette coding mode is the first palette coding mode (e.g., Escape mode) based on the prefix of the truncated binary code being equal to a particular codeword, e.g., a code having all bins that are equal to zero. The video coder may determine that the palette coding mode is the second palette coding mode (e.g., Copy Left mode) based on the prefix of the truncated binary code being equal to a value other than the codeword reserved for the first palette coding mode.

In the example of FIG. 7, if the video coder determines that the palette coding mode is the first palette coding mode (the "yes" branch of step 294), the video coder may code an escape pixel value for the pixel (296). For example, video encoder 20 may encode one or more syntax elements that indicate a pixel value for the pixel. Likewise, video decoder 30 may decode one or more syntax elements that indicate a pixel value for the pixel. In addition, according to aspects of this disclosure, the video coder may code a suffix for the escape value (298). That is, video encoder 20 may encode (or video decoder 30 may decode) a suffix for the pixel value after coding the pixel value, where the suffix follows the pixel value in the bitstream.

If the video coder determines that the palette coding mode is the second palette coding mode (the "no" branch of step 294), the video coder may code one or more syntax elements that indicate a run length for pixels to be coded with the pixel (300). According to aspects of this disclosure, the video coder may code the data that indicates the run length after coding the prefix of the truncated binary code, where the data that indicates the run length follows the prefix in the bitstream.

The video coder may also code, in some instances, a suffix for the truncated binary code (302). For example, the video coder may code a suffix for the truncated binary code, if such a suffix exists, after coding the data that indicates the run length, where the suffix follows the data that indicates the run length in the bitstream. In some examples, according to aspects of this disclosure, the video coder may code the suffix of the truncated binary code in parallel with the data that indicates a run length of pixels being coded with the current pixel.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially. In addition, while certain aspects of this disclosure are described as being performed by a single module or unit for purposes of clarity, it should be understood that the techniques of this disclosure may be performed by a combination of units or modules associated with a video coder.

Certain aspects of this disclosure have been described with respect to the developing HEVC standard for purposes of illustration. However, the techniques described in this disclosure may be useful for other video coding processes, including other standard or proprietary video coding processes not yet developed.

The techniques described above may be performed by video encoder 20 (FIGS. 1 and 2) and/or video decoder 30 (FIGS. 1 and 3), both of which may be generally referred to as a video coder. Likewise, video coding may refer to video encoding or video decoding, as applicable.

While particular combinations of various aspects of the techniques are described above, these combinations are provided merely to illustrate examples of the techniques described in this disclosure. Accordingly, the techniques of this disclosure should not be limited to these example combinations and may encompass any conceivable combination of the various aspects of the techniques described in this disclosure.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing video data, the method comprising:
   determining a palette for a palette-coded block of the video data, the palette including one or more palette entries, each respective palette entry representing a respective palette index;
   determining, based on a total number of indices represented by the palette entries of the palette determined for the palette-coded block, an input parameter for a truncated binary code that includes a prefix and a suffix, wherein the suffix of the truncated binary code represents the respective palette index for a pixel of the palette-coded block of the video data;
   coding the prefix of the truncated binary code; and
   selecting between a first palette coding mode and a second palette coding mode based only on the prefix of the truncated binary code to determine a palette coding mode with which to code the pixel of the palette-coded block.

2. The method of claim 1, wherein coding the prefix comprises determining that the prefix has all bins set equal to zero, and wherein selecting between the first palette coding mode and the second palette coding mode comprises selecting the first palette coding mode based on the prefix having all bins set equal to zero.

3. The method of claim 2, wherein the first palette coding mode is an escape palette coding mode, the method further comprising coding a pixel value for the pixel based on the suffix of the truncated binary code.

4. The method of claim 3, wherein coding the pixel value comprises coding the suffix after coding the prefix to determine the palette coding mode with which to code the pixel.

5. The method of claim 1, wherein selecting between the first palette coding mode and the second palette coding mode comprises selecting the second palette coding mode, the method further comprising coding data positioned between the prefix and the suffix of the truncated binary code to code data that indicates a run length of subsequent pixels to be coded with the pixel.

6. The method of claim 5, wherein coding the data that indicates the run length comprises coding the data that indicates the run length after coding the prefix of the truncated binary code, the method further comprising coding the suffix of the truncated binary code after coding the data that indicates the run length.

7. The method of claim 5, the method further comprising coding the suffix of the truncated binary code in parallel with coding the data that indicates the run length.

8. The method of claim 1, wherein determining the input parameter for the truncated binary code based on the total number of indices represented by the palette entries of the palette comprises determining the input parameter for the truncated binary code based only on the total number of indices represented by the palette entries of the palette.

9. The method of claim 8, wherein determining the input parameter for the truncated binary code based only on the total number of indices represented by the palette entries of the palette comprises determining the input parameter for the truncated binary code by solving the following equation, $L=\lfloor \log_2(N+2) \rfloor$, where L represents the input parameter and N represents the number of indices.

10. The method of claim 1, wherein selecting between the first palette coding mode and the second palette coding mode based only on the prefix comprises determining the palette coding mode prior to coding the suffix of the truncated binary code.

11. The method of claim 1, wherein coding comprises encoding, and wherein encoding the prefix of the truncated binary code comprises generating a portion of an encoded bitstream that includes the prefix of the truncated binary code.

12. The method of claim 1, further comprising receiving an encoded video bitstream that includes the prefix of the truncated binary code, wherein coding comprises decoding, and wherein decoding the prefix of the truncated binary code comprises parsing the prefix of the truncated binary code from the encoded bitstream.

13. A device for processing video data, the device comprising:
    a memory configured to store a block of the video data; and
    a video coder in communication with the memory, the video coder being configured to:
       determine that the block stored in the memory is a palette-coded block of the video data;
       determine a palette for the palette-coded block of the video data, the palette including one or more palette entries, each respective palette entry representing a respective palette index;
       determine, based on a total number of indices represented by the palette entries of the palette determined for the palette-coded block, an input parameter for a truncated binary code that includes a prefix and a suffix, wherein the suffix of the truncated binary code represents the respective palette index for a pixel of the palette-coded block of the video data;
       code the prefix of the truncated binary code; and
       select between a first palette coding mode and a second palette coding mode based only on the prefix of the truncated binary code to determine a palette coding mode with which to code the pixel of the palette-coded block.

14. The device of claim 13, wherein to code the prefix, the video coder is configured to determine that the prefix has all bins set equal to zero, and wherein to select between the first palette coding mode and the second palette coding mode, the video coder is configured to select the first palette coding mode based on the prefix having all bins equal to zero.

15. The device of claim 14, wherein the first palette coding mode is an escape palette coding mode, and wherein the video coder is further configured to code a pixel value for the pixel based on the suffix of the truncated binary code.

16. The device of claim 15, wherein to code the pixel value, the video coder is configured to code the suffix after coding the prefix to determine the palette coding mode with which to code the pixel.

17. The device of claim 13, wherein to select between the first palette coding mode and the second palette coding mode, the video coder is configured to select the second palette coding mode, and wherein the video coder is further configured to code data positioned between the prefix and the suffix of the truncated binary code to code data that indicates a run length of subsequent pixels to be coded with the pixel.

18. The device of claim 17, wherein to code the data that indicates the run length, the video coder is configured to code the data that indicates the run length after coding the prefix of the truncated binary code, and wherein the video coder is further configured to code the suffix of the truncated binary code after coding the data that indicates the run length.

19. The device of claim 17, wherein the video coder is configured to select the second palette coding mode, and wherein the video coder is further configured to code the suffix of the truncated binary code in parallel with coding the data that indicates the run length.

20. The device of claim 13, wherein to determine the input parameter for the truncated binary code based on the total number of indices represented by the palette entries of the palette, the video coder is configured to determine the input parameter for the truncated binary code based only on the total number of indices represented by the palette entries of the palette.

21. The device of claim 20, wherein to determine the input parameter for the truncated binary code based only on the total number of indices represented by the palette entries of the palette, the video coder is configured to solve the following equation, $L=\lfloor \log_2(N+2) \rfloor$, where L represents the input parameter and N represents the number of indices.

22. The device of claim 13, wherein to select between the first palette coding mode and the second palette coding mode based only on the prefix, the video coder is configured to determine the palette coding mode prior to coding the suffix of the truncated binary code.

23. The device of claim 13, wherein to code, the video coder is configured to encode, and wherein to encode the prefix of the truncated binary code, the video coder is configured to generate a portion of an encoded bitstream that includes the prefix of the truncated binary code.

24. The device of claim 13, further comprising an interface in communication with the memory and the video coder, wherein the interface is configured to receive an encoded video bitstream that includes the prefix of the truncated binary code, wherein to code, the video coder is configured to decode, and wherein to decode the prefix of the truncated binary code, the video coder is configured to parse the prefix of the truncated binary code from the encoded bitstream.

25. The device of claim 13, wherein the device comprises at least one of an integrated circuit, a microprocessor, a field programmable gate array (FPGA), a desktop computer, a laptop computer, a tablet computer, a phone, a digital media player, a video game console, a video game device, a video streaming device, a television, or a wireless communication device.

26. The device of claim 13, further comprising a camera configured to capture an image that includes the block of the video data.

27. The device of claim 13, further comprising a display configured to display an image that includes a reconstructed version of the palette-coded block.

28. An apparatus for processing video data, the apparatus comprising:
    means for determining a palette for a palette-coded block of the video data, the palette including one or more palette entries, each respective palette entry representing a respective palette index;
    means for determining, based on a total number of indices represented by the palette entries of the palette determined for the palette-coded block, an input parameter for a truncated binary code that includes a prefix and a suffix, wherein the suffix of the truncated binary code represents the respective palette index for a pixel of a the palette-coded block of the video data;
    means for coding the prefix of the truncated binary code; and
    means for selecting between a first palette coding mode and a second palette coding mode based only on the prefix of the truncated binary code to determine a palette coding mode with which to code the pixel of the palette-coded block.

29. A non-transitory computer-readable storage medium having instructions stored thereon that, when executed, cause one or more processors to:
    determine a palette for a palette-coded block of the video data, the palette including one or more palette entries, each respective palette entry representing a respective palette index;
    determine, based on a total number of indices represented by the palette entries of the palette determined for the palette-coded block, an input parameter for a truncated binary code that includes a prefix and a suffix, wherein the suffix of the truncated binary code represents the respective palette index for a pixel of the palette-coded block of the video data,
    code the prefix of the truncated binary code; and
    select between a first palette coding mode and a second palette coding mode based only on the prefix of the truncated binary code to determine a palette coding mode with which to code the pixel of the palette-coded block.

* * * * *